(12) United States Patent
Hashimoto

(10) Patent No.: US 11,757,354 B2
(45) Date of Patent: Sep. 12, 2023

(54) CHARGE PUMP CIRCUIT

(71) Applicant: Innolux Corporation, Miao-Li County (TW)

(72) Inventor: Kazuyuki Hashimoto, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 17/408,504

(22) Filed: Aug. 23, 2021

(65) Prior Publication Data

US 2022/0239220 A1 Jul. 28, 2022

Related U.S. Application Data

(60) Provisional application No. 63/142,498, filed on Jan. 28, 2021.

(51) Int. Cl.
*H02M 3/07* (2006.01)
(52) U.S. Cl.
CPC .................................. *H02M 3/07* (2013.01)
(58) Field of Classification Search
CPC ...................................................... H02M 3/07
See application file for complete search history.

(56) References Cited

U.S. PATENT DOCUMENTS

| | | | | |
|---|---|---|---|---|
| 2007/0063760 A1* | 3/2007 | Stopel | ................... | H02M 3/073 327/536 |
| 2010/0127761 A1* | 5/2010 | Matano | ................... | H02M 3/07 327/536 |
| 2010/0164600 A1* | 7/2010 | Liu | .......................... | H02M 3/07 327/437 |
| 2010/0188385 A1* | 7/2010 | Boiko | ................... | G11C 19/184 377/68 |
| 2017/0163148 A1* | 6/2017 | Lin | .......................... | G05F 3/30 |

FOREIGN PATENT DOCUMENTS

CN 101647181 2/2010

* cited by examiner

*Primary Examiner* — Sibin Chen
(74) *Attorney, Agent, or Firm* — JCIPRNET

(57) ABSTRACT

A charge pump circuit is provided. The charge pump circuit includes a first transistor, a first capacitor, a second transistor, and a second capacitor. The first transistor has a first end and a second end. The first capacitor has a first end and a second end. The second end of the first capacitor is electrically connected to the second end of the first transistor. The second transistor has a first end and a second end. The first end of the second transistor is electrically connected to the second of the first transistor. The second capacitor has a first end and a second end. The first end of the second capacitor is electrically connected to the second end of the second transistor.

18 Claims, 13 Drawing Sheets

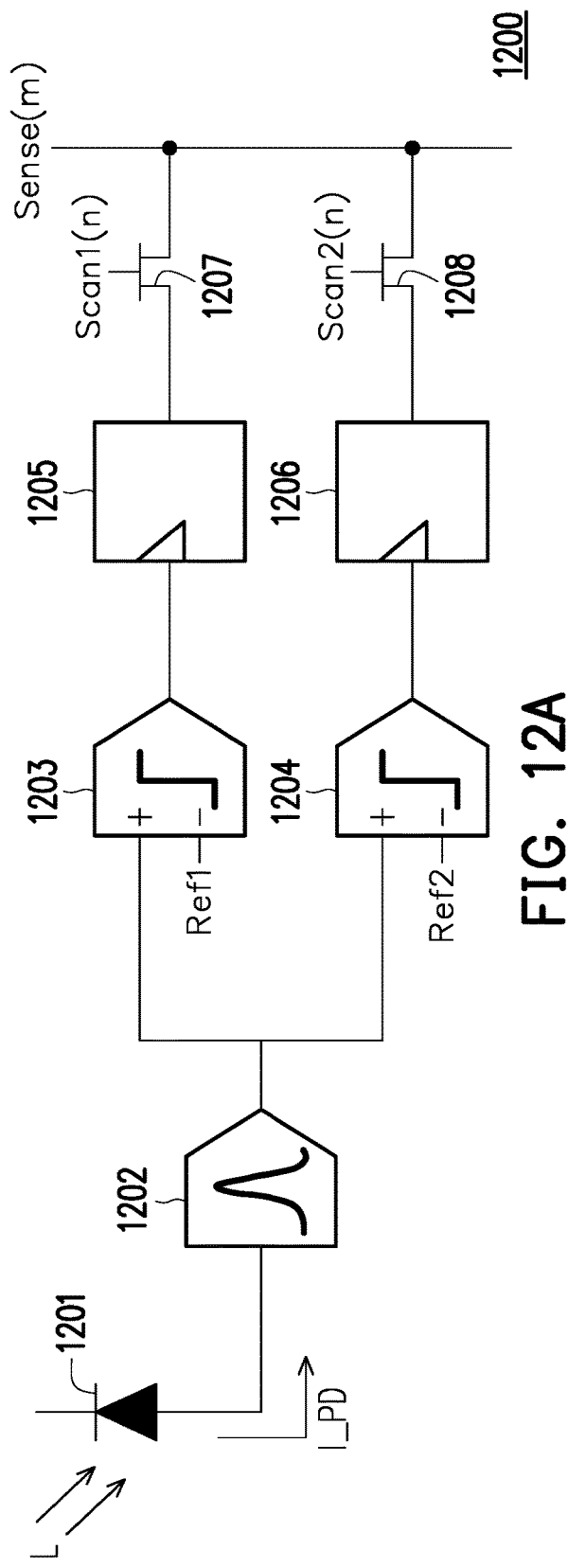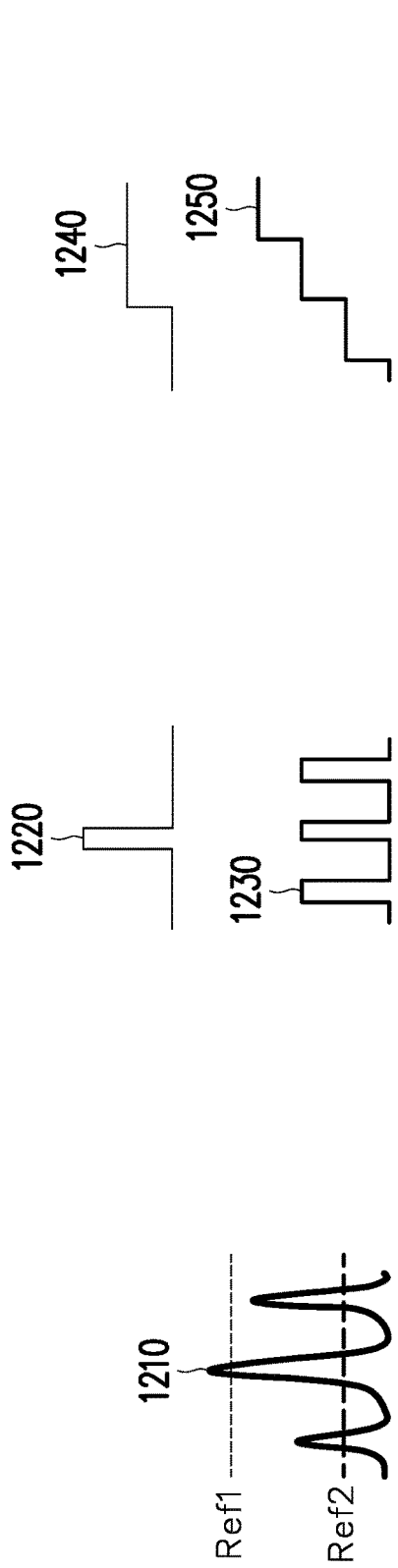
FIG. 12A
FIG. 12B
FIG. 12C
FIG. 12D

CHARGE PUMP CIRCUIT

CROSS-REFERENCE TO RELATED APPLICATION

This application claims the priority benefit of U.S. provisional patent application Ser. No. 63/142,498, filed on Jan. 28, 2021. The entirety of the above-mentioned patent application is hereby incorporated by reference and made a part of this specification.

BACKGROUND

Technical Field

The disclosure relates a circuit; particularly, the disclosure relates to a charge pump circuit.

Description of Related Art

A display device generally comprises a display panel and a driving circuit. Since the limitation of the material of the display panel, some part of the driving circuit is often disposed on a driving integrated circuit instead of on the display panel. For example, a sweep signal generator is disposed on driving integrated circuit to provide a sweep signal for the pixels on the display panels.

However, in order to provide the sweep signal from the driving integrated circuit to the display panel, low impedance transmission is required. Also, for the optimization of area overhead, the sweep signal is used to provide to all the pixels. Therefore, the low resistance and low parasitic capacitance of the transmission line and the condition of sweep signal bring some limitations to the display device.

Further, a charge pump circuit is commonly used in voltage regulator. Since the output of the charge pump circuit is not linear, the charge pump circuit is not suitable for a signal generator.

SUMMARY

The disclosure is direct to a charge pump circuit, so as to implement an in-pixel sweep signal generator.

In the disclosure, the charge pump circuit includes a first transistor, a first capacitor, a second transistor, and a second capacitor. The first transistor has a first end and a second end. The first capacitor has a first end and a second end. The second end of the first capacitor is electrically connected to the second end of the first transistor. The second transistor has a first end and a second end. The first end of the second transistor is electrically connected to the second of the first transistor. The second capacitor has a first end and a second end. The first end of the second capacitor is electrically connected to the second end of the second transistor.

Based on the above, according to the charge pump circuit of the disclosure, by applying a plurality of input signals to the charge pump circuit, a plurality of output signals are obtain. Since the structure of the charge pump circuit is simple, it is able to be disposed on the substrate and thereby an in-pixel sweep signal generator may be implemented.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 12A is a schematic block diagram of a pixel circuit for photon counting detector according to one embodiment of the disclosure.

FIG. 12B is a schematic input signal of the comparators of a pixel circuit for photon counting detector according to one embodiment of the disclosure.

FIG. 12C is schematic output signals of the comparators of a pixel circuit for photon counting detector according to one embodiment of the disclosure.

FIG. 12D is schematic output signals of the counters of a pixel circuit for photon counting detector according to one embodiment of the disclosure.

DESCRIPTION OF EMBODIMENTS

Figure 1:
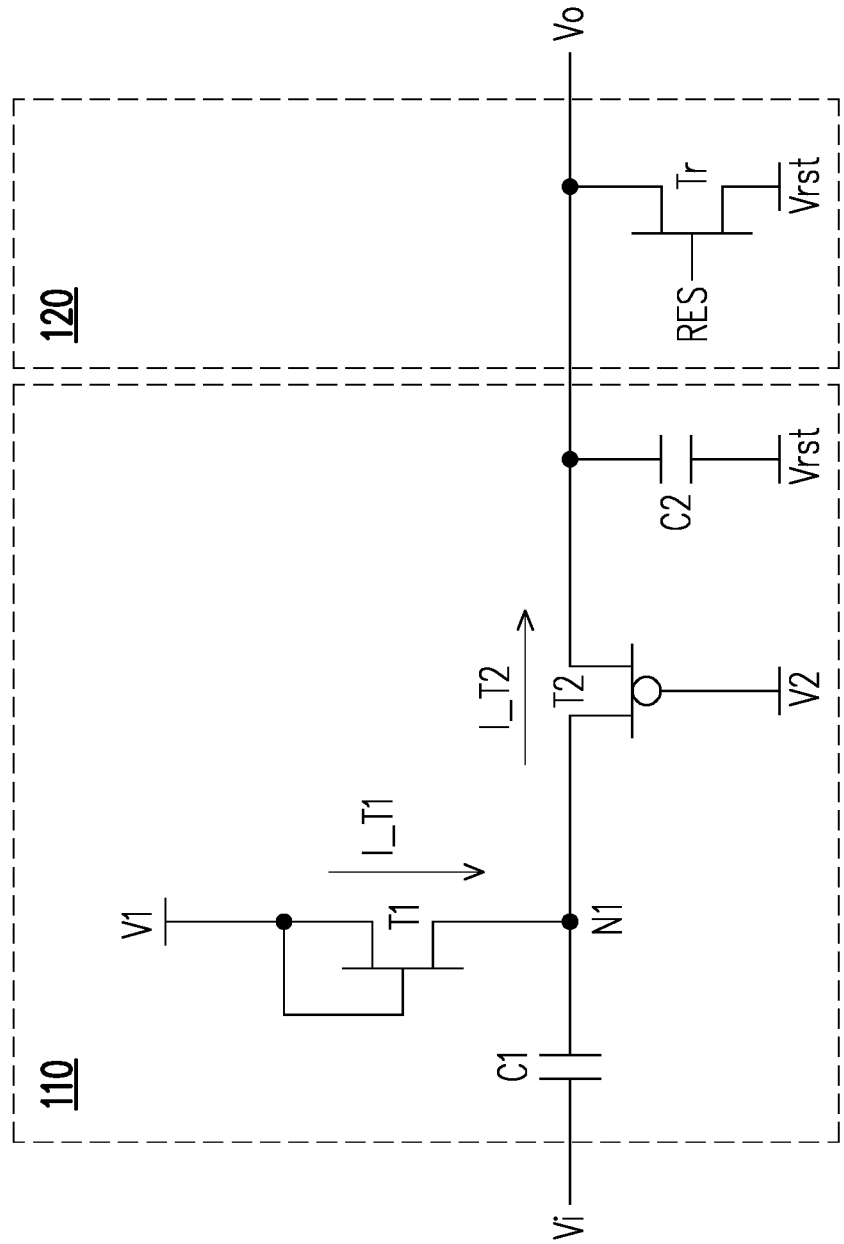
FIG. 1 is a schematic diagram of a charge pump circuit according to a first embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

The light emitting device of the disclosure may, for example, be adapted to a liquid crystal, a light emitting diode, a quantum dot (QD), a fluorescence, a phosphor, other suitable materials, or the combination of the aforementioned materials, but the disclosure is not limited thereto. The light emitting diode may include, for example, organic light emitting diode (OLED), sub-millimeter light emitting diode (Mini LED), micro light emitting diode (Micro LED), or quantum dot light emitting diode (QLED or QDLED) or other suitable materials. The materials may be arranged and combined arbitrarily, but the disclosure is not limited to thereto. The light emitting device of the disclosure may include peripheral systems such as driving system, control system, light source system, shelf system, and the like to support the light emitting device.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

FIG. 1 is a schematic diagram of a charge pump circuit according to a first embodiment of the disclosure. Referring to FIG. 1, a charge pump circuit 100 may include a pump up circuit 110 and a reset circuit 120. The pump up circuit 110 may include a first transistor T1, a second transistor T2, a first capacitor C1, and a second capacitor C2. Specifically, the first transistor T1 may have a first end and a second end. In one embodiment, the first end of the first transistor T1 may be the source terminal and the second end of the first transistor T1 may be the drain terminal, but this disclosure is not limited thereto. In another embodiment, the first end of the first transistor T1 may be the drain terminal and the second of the first transistor T1 may be the source terminal. In the embodiment, the first capacitor C1 may have a first end and a second end. The second end of the first capacitor C1 may be electrically connected to the second end of the first transistor T1 at a first node N1. The second transistor T2 may have a first end and a second end. In the embodiment, the first end of the second transistor T2 may be electrically connected to the second end of the first transistor T1 at the first node N1. The second capacitor C2 may have a first end and a second end. The first end of the second capacitor C2 may be electrically connected to the second end of the second transistor T2.

Further, the reset circuit 120 may include a reset transistor Tr. The reset transistor may have a first end and a second end. The first end of the reset transistor Tr may be electrically connected to the first end of the second capacitor C2. The second end of the reset transistor Tr may receive a reset voltage. The reset transistor Tr may further have a control end. The control end of the reset transistor Tr may receive a reset signal RES.

In the embodiment, the reset circuit 120 may be disposed in the charge pump circuit 100. The reset circuit 120 and the pump up circuit 110 may be integrated in an electronic device (for example, in a pixel of a display device). In the embodiment, the electronic device may include a light emitting device or a display device, but the disclosure is not limited thereto. In one embodiment, the display device may include an active matrix light emitting diode (AM-LED) display panel, but the disclosure is not limited thereto.

In addition, in one embodiment, the reset circuit 120 may be disposed outside the charge pump circuit 100. In the embodiment the reset circuit 120 may be disposed on a driving integrated circuit of the pixel of the display device to provide the reset signal RES to the pump up circuit 110. That is, the charge pump circuit 100 may not include the reset circuit 120, but the disclosure is not limited thereto.

Figure 2:
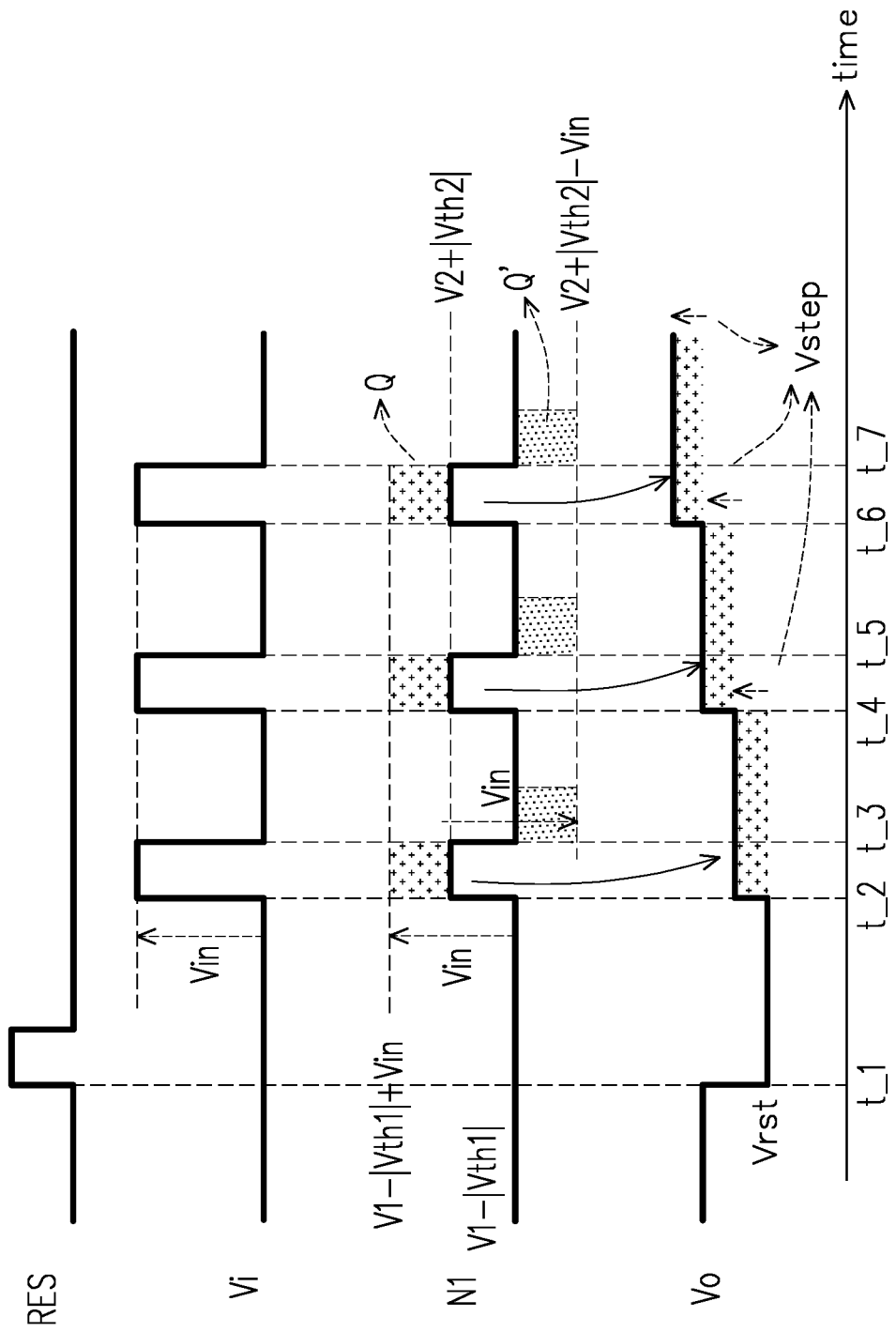
FIG. 2 is a schematic signal timing chart of the charge pump circuit according to the first embodiment of the disclosure.

FIG. 2 is a schematic signal timing chart of the charge pump circuit according to the first embodiment of the disclosure. Referring to FIG. 1 and FIG. 2, the first end of the first capacitor C1 may receive an input signal Vi, and the first end of the second capacitor C2 may provide an output signal Vo. In the embodiment, the first end of the transistor T1 receives a first voltage V1, and a control end of the second transistor T2 receives a second voltage V2. The first voltage V1 may be lower than the second voltage V2, but this disclosure is not limited thereto. The second end of the second capacitor C2 receives the reset voltage Vrst. The first transistor T1 may have a first threshold voltage Vth1, and the second transistor T2 may have a second threshold voltage Vth2. The first end of the first transistor T1 is electrically connected to a control end of the first transistor. That is, the first transistor T1 may act as a diode. In the embodiment, the first transistor T1 may be an N-type transistor and the second transistor T2 may be a P-type transistor, but this disclosure is not limited thereto. In one embodiment, the first transistor T1 may be a P-type transistor and the second transistor T2 may be an N-type transistor.

In the embodiment, for the convenience of understanding, for example, the first voltage V1 may be 7 volts. The second voltage V2 may be 9 volts. An absolute value of the first threshold voltage Vth1 and the second threshold voltage Vth2 may be 1 volt, but this disclosure is not limited thereto. At time t_1, the reset signal RES may be switched from a low voltage level to a high voltage level. After the high voltage level is applied to the control end of the reset transistor Tr, the reset transistor Tr is turned on and the first end of the second capacitor C2 is reset to the reset voltage Vrst. That is, the output signal Vo is reset to the reset voltage Vrst. Before time t_2, the reset signal RES may be switched from the high voltage level to the low voltage level. Further, the voltage of the first node N1 may be obtained by subtracting the first threshold voltage Vth1 from the first voltage V1, thus the voltage of the first node N1 may be represented as V1−|Vth1|.

At time t_2, the input signal Vi may be switched from the low voltage level to the high voltage level, and the voltage difference between the low voltage level and the high voltage level may be an input voltage Vin. In the embodiment, the input voltage Vin is assumed to be 5 volts, but this disclosure is not limited thereto. Since a voltage difference between the first end and the second end of the first capacitor C1 may maintain a constant value, the voltage of the first node N1 may be change from V1−|Vth1| to V1−|Vth1|+Vin. However, since the first node N1 is electrically connected to the first end of the second transistor T2, the voltage value of the first node N1 may be confined by the second transistor T2. That is, at time t_2, the voltage value of the first node N1 may be V2+|Vth2| (the solid line of N1 in FIG. 2) instead of V1−|Vth1|+Vin (the dashed line of N1 in FIG. 2) and the second transistor T2 may be turned on. Therefore, an extra charge Q may be discharged from the first capacitor C1 based on the voltage difference and may be calculated by the following equation (1).

$$Q = C1 \times \{(V1-|Vth1|)+Vin-(V2+|Vth2|)\} \quad (1)$$

In the embodiment, the extra charge Q may be transferred by a second transistor current I_T2 from the first capacitor C1 to the second capacitor C2, and thereby may charge the second capacitor C2. That is, the value of the output signal Vo may be increased by a value of a step voltage Vstep and the value of the step voltage Vstep may be calculated by the following equation (2).

$$Vstep = \frac{C1}{C2} \times \{(V1-|Vth1|)+Vin-(V2+|Vth2|)\} \quad (2)$$

In the embodiment, a ratio of the first capacitor C1 and the second capacitor C2 may be 1/100. That is, the value of the step voltage Vstep may be 10 millivolts. Therefore, the value of the output signal Vo may be increased from the reset voltage Vrst to Vrst+Vstep.

At time t_3, the input signal Vi may be switched from the high voltage level to the low voltage level, and the voltage difference between the low voltage level and the high voltage level may be also the input voltage Vin. Since a voltage difference between the first end and the second end of the first capacitor C1 may maintain a constant value, the voltage of the first node N1 may be change from V2+|Vth2| to V2+|Vth2|−Vin. However, since the first node N1 is electrically connected to the second end of the first transistor T1, the voltage value of the first node N1 may be confined by the first transistor T1. That is, at time t_3, the voltage value of the first node N1 may be V1−|Vth1| (the solid line of N1 in FIG. 2) instead of V2+|Vth2|−Vin (the dashed line of N1 in FIG. 2) and the first transistor T1 may be turned on. Therefore, an insufficient charge Q' may be charged into the first capacitor C1 by a first transistor current I_T1 based on the voltage difference, and may be calculated by the following equation (3).

$$Q' = C1 \times \{(V2+|Vth2|)-Vin-(V1+|Vth1|)\} = -Q \quad (3)$$

At time t_4, the input signal Vi may be switched from the low voltage level to the high voltage level and the voltage difference between the low voltage level and the high voltage level may be an input voltage Vin. Referring to time t_2, the extra charge Q may be discharged from the first capacitor C1. Further, the extra charge Q may be transferred by the second transistor current I_T2 from the first capacitor C1 to the second capacitor C2 and thereby may charge the second capacitor C2. That is, the value of the output signal Vo may be increased by the value of the step voltage Vstep. Therefore, the value of the output signal Vo may be increased from Vrst+Vstep to Vrst+(2×Vstep).

At time t_5, the input signal Vi may be switched from the high voltage level to the low voltage level, and the voltage difference between the low voltage level and the high voltage level may be also the input voltage Vin. Referring to time t_3, the insufficient charge Q' may be charged into the first capacitor C1 by the first transistor current I_T1.

At time t_6, the input signal Vi may be switched from the low voltage level to the high voltage level, and the voltage difference between the low voltage level and the high voltage level may be an input voltage Vin. Referring to times t_2 and t_4, the extra charge Q may be discharged from the first capacitor C1. Further, the extra charge Q may be transferred by the second transistor current I_T2 from the first capacitor C1 to the second capacitor C2, and thereby may charge the second capacitor C2. That is, the value of the output signal Vo may be increased by the value of the step voltage Vstep. Therefore, the value of the output signal Vo may be increased from Vrst+(2×Vstep) to Vrst+(3×Vstep).

At time t_7, the input signal Vi may be switched from the high voltage level to the low voltage level, and the voltage difference between the low voltage level and the high voltage level may be also the input voltage Vin. Referring to times t_3 and t_5, the insufficient charge Q' may be charged into the first capacitor C1 by the first transistor current I_T1.

It should be noted that, the output signal Vo may be increased by the value of the step voltage Vstep at times t_2, t_4, and t_6, respectively. That is, by repeating switching the input signal Vi between the high voltage level and the low voltage level, the value of the output signal Vo may be increased to a plurality of different values. Further, the plurality of different values may be proportional to the number of repetitions of switching the input signal Vi. That is, a variety of waveforms may be able to be output by the charge pump circuit 100 and the output is substantially linear. Therefore, the charge pump circuit 100 may be used as a signal generator. In one embodiment, the charge pump circuit 100 may be used as a sweep signal generator for a pixel of a display device to implement an in-pixel sweep signal generator. Further, since the structure of the charge pump circuit 100 is simple, the charge pump circuit 100 may be disposed on the substrate and thereby an in-pixel sweep signal generator may be implemented. In one embodiment, the substrate may comprise glass or polyimide or other suitable materials, but this disclosure is not limited thereto.

In the embodiment, the second transistor T2 is a P-type transistor, but this disclosure is not limited thereto. In the embodiment, the second transistor T2 may provide a charging current (the second transistor current I_T2) of the second capacitor C2 and thereby the charge pump circuit 100 may be a pump up circuit. In another embodiment, the second transistor T2 may be an N-type transistor, and thereby may provide a discharging current of the second capacitor C2. Therefore, the charge pump circuit 100 may become a pump down circuit.

Figure 3:
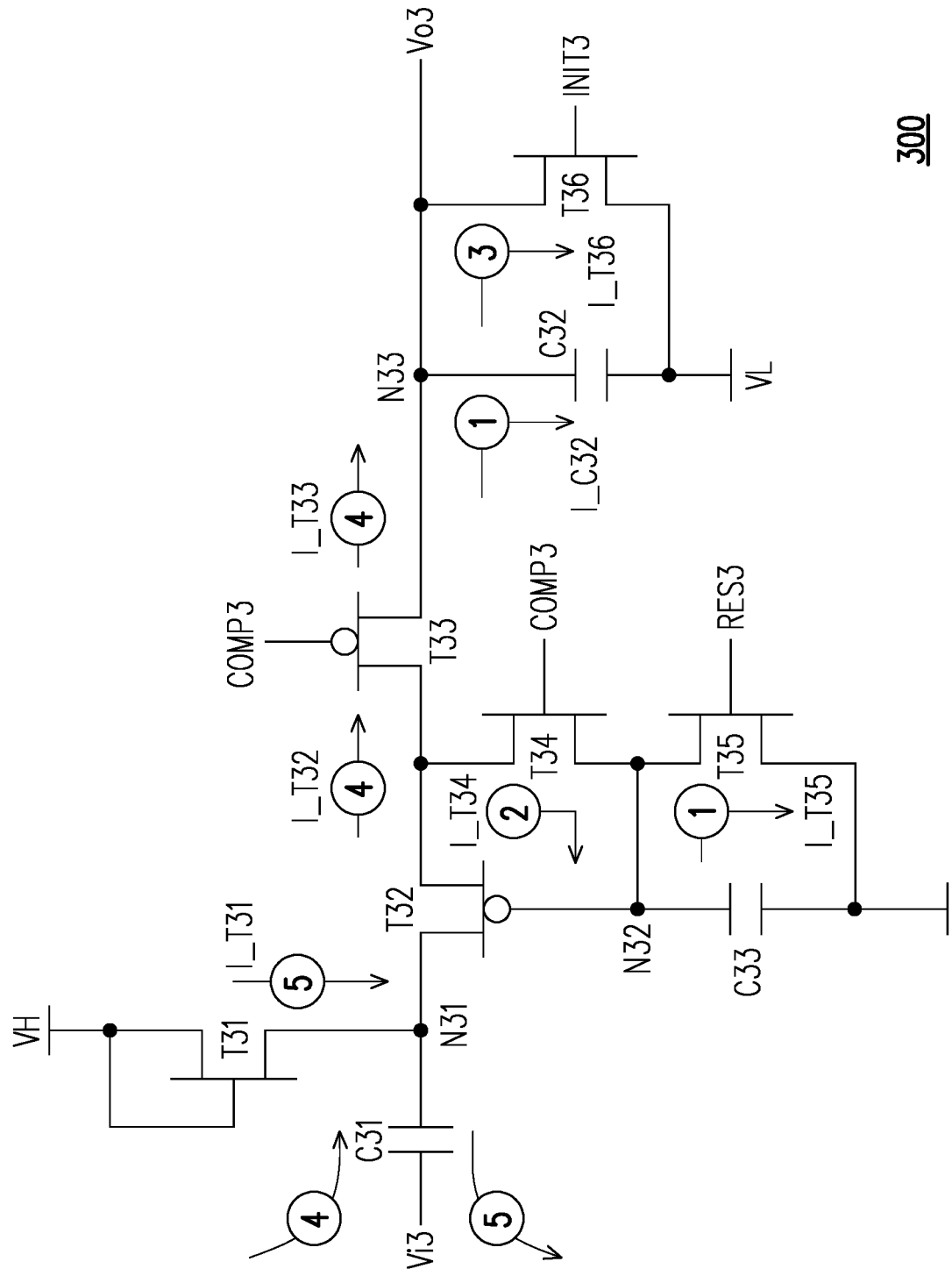
FIG. 3 is a schematic diagram of a charge pump circuit according to a second embodiment of the disclosure.

FIG. 3 is a schematic diagram of a charge pump circuit according to a second embodiment of the disclosure. Referring to FIG. 1 and FIG. 3, a charge pump circuit 300 may have a similar structure as the charge pump circuit 100. The charge pump circuit 300 may include a first transistor T31, a second transistor T32, a first capacitor C31, and a second capacitor C32. These elements may be referred to the charge pump circuit 100 and the details are not redundantly described seriatim herein.

In the embodiment, the charge pump circuit 300 may further include a third transistor T33, a fourth transistor T34, a fifth transistor T35, a sixth transistor T36, and a third capacitor C33. In the embodiment, the third transistor T33 may have a first end and a second end. The third transistor T33 may be electrically connected between the second end of the second transistor T32 and the first end of the second capacitor C32. The third capacitor C33 may have a first end and a second end. The first end of the third capacitor C33 may be electrically connected to a control end of the second transistor T32. The fourth transistor T34 may have a first end and a second end. The fourth transistor T34 may be electrically connected between the second end of the second transistor T32 and the first end of the third capacitor C33. The fifth transistor T35 may have a first end and a second end. The fifth transistor T35 may be electrically connected between the second end of the fourth transistor T34 and the second end of the third capacitor C33. The sixth transistor T36 may have a first end and a second end. The sixth transistor T36 may be electrically connected between the second end of the third transistor T33 and the second end of the second capacitor C32. In the embodiment, the second end of the first capacitor C31 may be indicated as a first node N31, the first end of the third capacitor C33 may be indicated as a second node N32, and a first end of the second capacitor C32 may be indicated as a third node N33. In the embodiment, the first transistor T31 may have a first threshold voltage Vth31, the second transistor T32 may have a second threshold voltage Vth32, but this disclosure is not limited thereto.

In the embodiment, the first end of the first transistor T31 receives a first reference voltage VH. A second end of the second capacitor C32 receives a second reference voltage VL. A second end of the third capacitor C33 receives a reset voltage Vrst3. In the embodiment, a control end of the fifth transistor T35 may receive a reset signal RES3. A control end of the sixth transistor T36 may receive an initialization signal INIT3. In the embodiment, a control end of the third transistor T33 and a control end of the fourth transistor T34 receive a compensation signal COMP3. In the embodiment, a first end of the first capacitor C31 may receive an input signal Vi3. A first end of the second capacitor C32 may provide an output signal Vo3.

Figure 4:
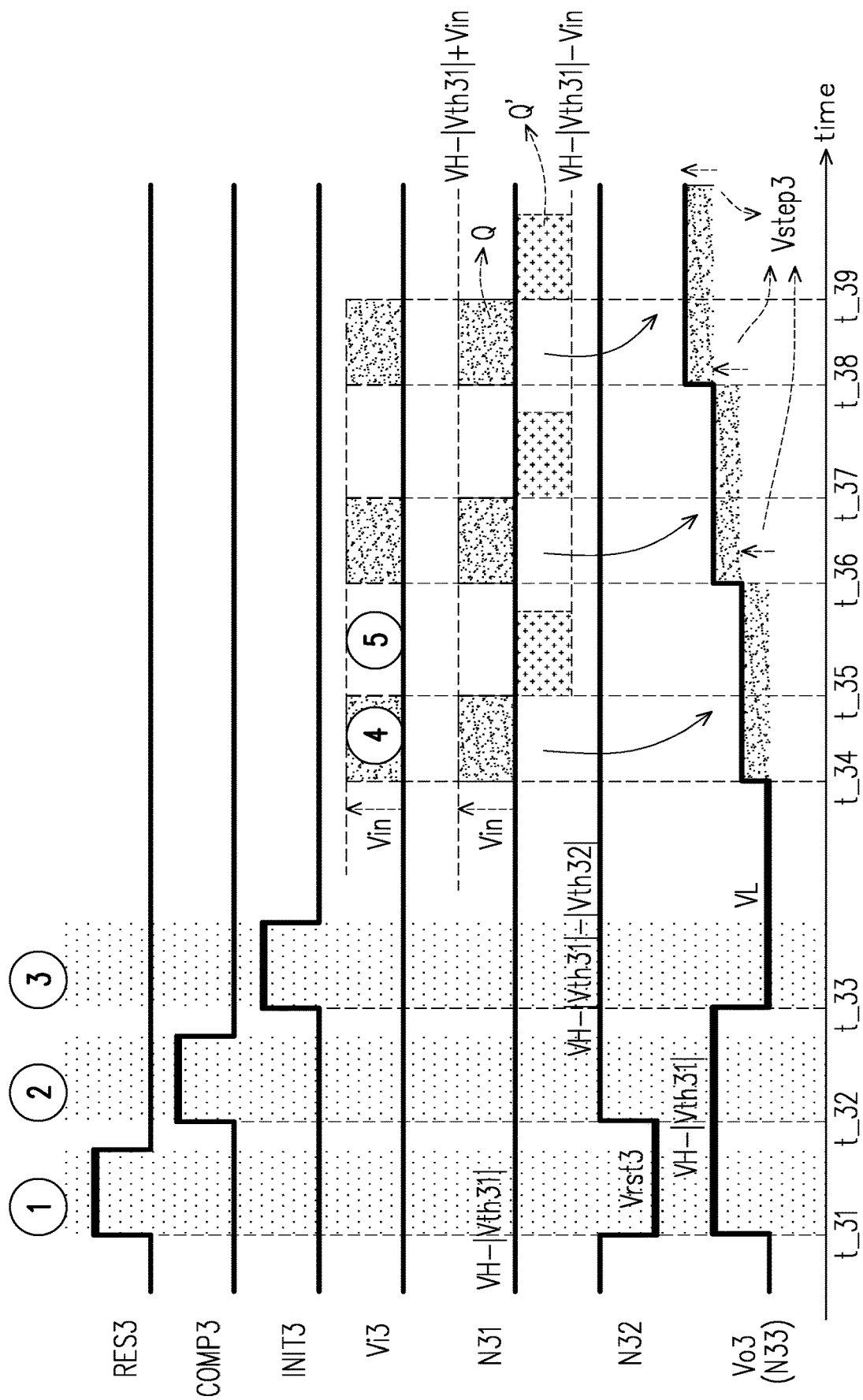
FIG. 4 is a schematic signal timing chart of the charge pump circuit according to the second embodiment of the disclosure.

FIG. 4 is a schematic signal timing chart of the charge pump circuit according to the second embodiment of the disclosure. Referring to FIG. 3 and FIG. 4, the circled numbers in the figures may indicate different steps of the operation of the charge pump circuit 300, respectively. The arrows with the circled numbers in the figures may indicate the currents during a certain steps of the operation of the charge pump circuit 300, respectively. An arrow toward the first capacitor C31 may indicate charging the first capacitor C31, and an arrow away from the first capacitor C31 may indicate discharging the first capacitor C31.

During the period from time t_31 to time t_32 (step 1), the reset signal RES3 may be switched from a low voltage level to a high voltage level, and the compensation signal COMP3 and initialization signal INIT3 may be remained at a low voltage level. After the high voltage level is applied to the control end of the fifth transistor T35, the fifth transistor T35 is turned on. Therefore, the first end of the third capacitor C33 is reset to the reset voltage Vrst3 by a fifth transistor current I_T35. That is, the second node N32 is reset to the reset voltage Vrst3. Since the reset voltage Vrst3 is at a low voltage level, the second transistor T32 may be turned on. Further, the first transistor T31 is turned on due to the high voltage level of the first reference voltage VH, and the third transistor T33 is turned on due to the low voltage level of the compensation signal COMP3. Therefore, the first node N31 and the third node N33 are both reset to VH−|Vth31| by the second capacitor current I_C32. Before time t_32, the reset signal RES may be switched from the high voltage level to the low voltage level.

During the period from time t_32 to time t_33 (step 2), the compensation signal COMP3 may be switched from a low voltage level to a high voltage level. After the high voltage level is applied to the control end of the third transistor T33 and fourth transistor T34, the third transistor T33 is switched from on to off and the fourth transistor T34 is switched from off to on. The second node N32 is then compensated to VH−|Vth31|−|Vth32|, by the fourth transistor current I_T34. Before time t_33, the compensation signal COMP3 may be switched from the high voltage level to the low voltage level.

During the period from time t_33 to time t_34 (step 3), the initialization signal INIT3 may be switched from a low voltage level to a high voltage level. After the high voltage level is applied to the control end of the sixth transistor T36, the sixth transistor T36 is switched from off to on. The node N33 is reset to a second reference voltage VL by a sixth transistor current I_T36. Before time t_34, the initialization signal INIT3 may be switched from the high voltage level to the low voltage level.

During the period from time t_t34 to time t_t35 (step 4), the input signal Vi3 may be switched from a low voltage level to a high voltage level, and the voltage difference between the low voltage level and the high voltage level may be an input voltage Vin. Since a voltage difference between the first end and the second end of the first capacitor C1 may maintain a constant value, the voltage of the first node N31 may be change from VH−|Vth31| to VH−|Vth31|+Vin. However, since the first node N31 is electrically connected to the first end of the second transistor T32, the voltage value of the first node N31 may be confined by the second transistor T32. That is, at time t_34, the voltage value of the first node N31 may be remained at VH−|Vth31| (the solid line of N31 in FIG. 4) instead of VH−|Vth31|+Vin (the dashed line of N31 in FIG. 4). The second transistor T32 and the third transistor T33 may be turned on. Therefore, an extra charge Q may be discharged from the first capacitor C31 based on the voltage difference and may be calculated by the following equation (4).

$$Q=C31\times\{(VH-|Vth31|+Vin)-(VH-|Vth31|)\}=C31\times Vin \qquad (4)$$

In the embodiment, the extra charge Q may be transferred by a second transistor current I_T32 and a third transistor current I_T33 from the first capacitor C31 to the second capacitor C32 and thereby may charge the second capacitor C32. That is, the value of the output signal Vo3 may be increased by a value of a step voltage Vstep3 and the value of the step voltage Vstep3 may be calculated by the following equation (5).

$$Vstep3 = \frac{C31}{C32} \times Vin \qquad (5)$$

Therefore, the value of the output signal Vo3 may be increased from the second reference voltage VL to VL+Vstep3.

During the period from time t_35 to time t_36 (step 5), the input signal Vi3 may be switched from the high voltage level to the low voltage level, and the voltage difference between the low voltage level and the high voltage level may be also the input voltage Vin. Since a voltage difference between the first end and the second end of the first capacitor C1 may maintain a constant value, the voltage of the first node N31 may be change from VH−|Vth31| to VH−|Vth31|−Vin. However, since the first node N31 is electrically connected to the second end of the first transistor T31, the voltage value of the first node N31 may be confined by the first transistor T31. That is, at time t_34, the voltage value of the first node N31 may be remained at VH−|Vth31|(the solid line of N31 in FIG. 4) instead of VH−|Vth31|−Vin (the dashed line of N31 in FIG. 4) and the first transistor T31 may be turned on. Therefore, an insufficient charge Q' may be charged into the first capacitor C31 by the first transistor current I_T31 based on the voltage difference and may be calculated by the following equation (6).

$$Q'=C31\times\{(VH-|Vth31|-Vin)-(VH-|Vth31|)\}=C31\times(-Vin)=-Q \quad (6)$$

During the period from time t_36 to time t_37, the charging operation may repeat again as the step 4. The extra charge Q may be discharged from the first capacitor C31. Further, the extra charge Q may be transferred by the second transistor current I_T32 and the third transistor current I_T33 from the first capacitor C31 to the second capacitor C32 and thereby may charge the second capacitor C32. Therefore, the value of the output signal Vo3 may be increased from VL+Vstep3 to VL+(2×Vstep3). During the period from time t_37 to time t_38, the charging operation may repeat again as the step 5. The insufficient charge Q' may be charged into the first capacitor C31 by the first transistor current I_T31.

During the period from time t_38 to time t_39, the charging operation may repeat again as the step 4. The extra charge Q may be discharged from the first capacitor C31. Further, the extra charge Q may be transferred by the second transistor current I_T32 and the third transistor current I_T33 from the first capacitor C31 to the second capacitor C32 and thereby may charge the second capacitor C32. Therefore, the value of the output signal Vo3 may be increased from VL+(2×Vstep3) to VL+(3×Vstep3). After time t_39, the charging operation may repeat again as the step 5. The insufficient charge Q' may be charged into the first capacitor C31 by the first transistor current I_T31.

It should be noted that, the value of the output signal Vo3 may be increased by the value of the step voltage Vstep3 at times t_34, t_36, and t_38, respectively. That is, by repeating the step 4 and the step 5, the value of the output signal Vo3 may be increased to a plurality of different values. Further, the plurality of different values are proportional to the number of repeating the step 4 and the step 5. That is, a variety of waveforms may be able to be output by the charge pump circuit 300, and the output is substantially linear. Therefore, the charge pump circuit 300 may be used as a signal generator. In one embodiment, the charge pump circuit 300 may be used as a sweep signal generator for a pixel of a display device to implement an in-pixel sweep signal generator. Further, since the structure of the charge pump circuit 300 is simple, the charge pump circuit 300 may be disposed on the substrate, and thereby an in-pixel sweep signal generator may be implemented.

In the embodiment, the second transistor T32 is a P-type transistor, but this disclosure is not limited thereto. In the embodiment, the second transistor T32 may provide a charging current (the second transistor current I_T32) of the second capacitor C32 and thereby the charge pump circuit 300 may be a pump up circuit. In another embodiment, the second transistor T32 may be an N-type transistor, and thereby may provide a discharging current of the second capacitor C32. Therefore, the charge pump circuit 300 may become a pump down circuit.

Figure 5:
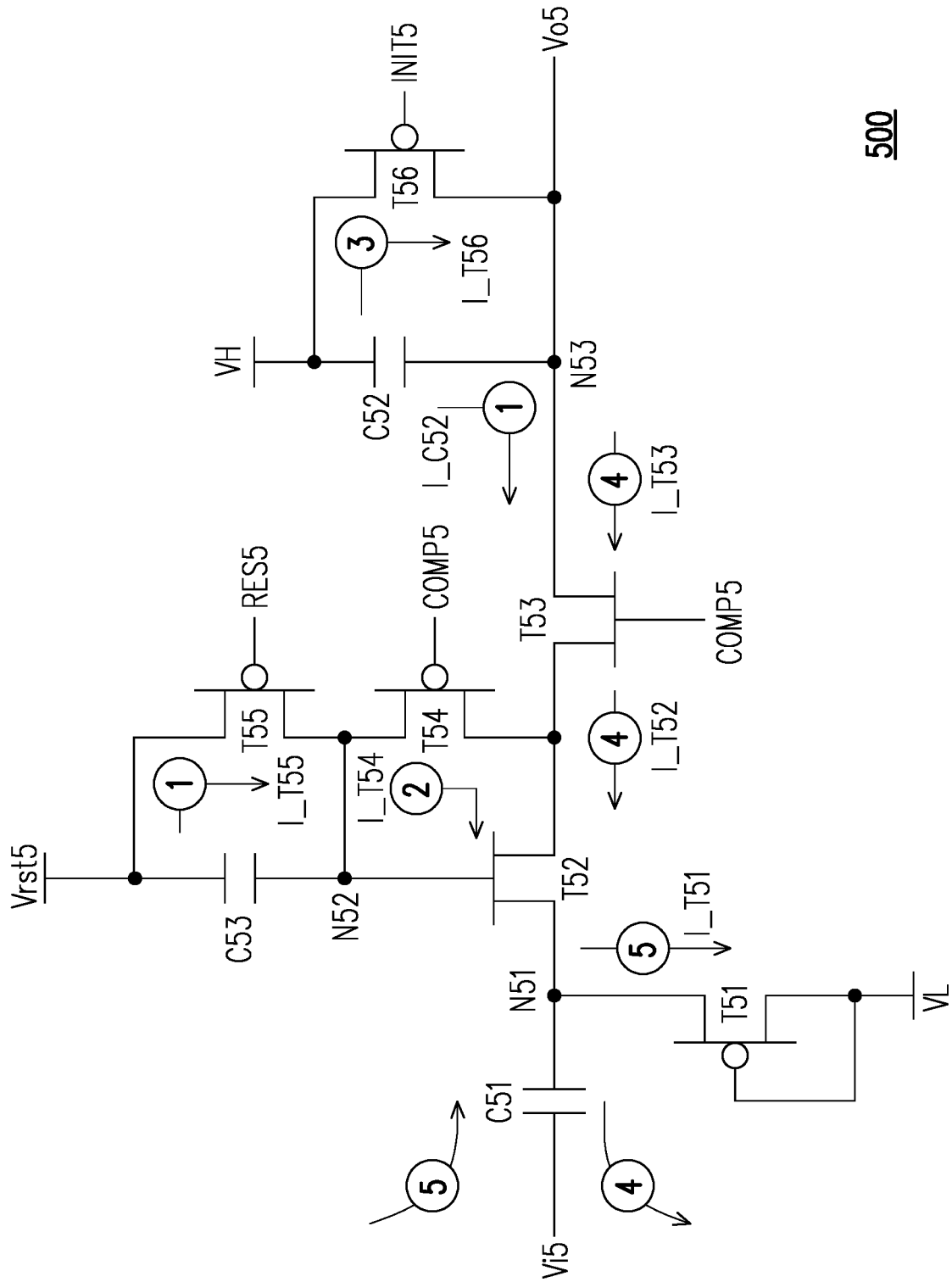
FIG. 5 is a schematic diagram of a charge pump circuit according to a modification of the second embodiment of the disclosure.

FIG. 5 is a schematic diagram of a charge pump circuit according to a modification of the second embodiment of the disclosure. Referring to FIG. 5, the main difference between FIG. 3 and FIG. 5 is that, the second transistor T32 of the charge pump circuit 300 is a P-type transistor and the second transistor T52 of the charge pump 500 is an N-type transistor. In the embodiment, the charge pump circuit 500 may include a first transistor T51, a second transistor T52, a first capacitor C51, and a second capacitor C52. These elements may be referred to the charge pump circuit 100 and the details are not redundantly described seriatim herein.

In the embodiment, the charge pump circuit 500 may further include a third transistor T53, a fourth transistor T54, a fifth transistor T55, a sixth transistor T56, and a third capacitor C53. In the embodiment, the third transistor T53 may have a first end and a second end. The third transistor T53 may be electrically connected between the second end of the second transistor T52 and the first end of the second capacitor C52. The third capacitor C53 may have a first end and a second end. The first end of the third capacitor C53 may be electrically connected to a control end of the second transistor T52. The fourth transistor T54 may have a first end and a second end. The fourth transistor T54 may be electrically connected between the second end of the second transistor T52 and the first end of the third capacitor C53. The fifth transistor T55 may have a first end and a second end. The fifth transistor T55 may be electrically connected between the second end of the fourth transistor T54 and the second end of the third capacitor C53. The sixth transistor T56 may have a first end and a second end. The sixth transistor T56 may be electrically connected between the second end of the third transistor T53 and the second end of the second capacitor C52.

In the embodiment, the second end of the first capacitor C51 may be indicated as a first node N51, the first end of the third capacitor C53 may be indicated as a second node N52, and a first end of the second capacitor C52 may be indicated as a third node N53. In the embodiment, the first transistor T51 may have a first threshold voltage Vth51, the second transistor T52 may have a second threshold voltage Vth52, but this disclosure is not limited thereto. In the embodiment, the first end of the first transistor T51 receives a second reference voltage VL. A second end of the second capacitor C52 receives a first reference voltage VH. A second end of the third capacitor C53 receives a reset voltage Vrst5.

In the embodiment, a control end of the fifth transistor T55 may receive a reset signal RES5. A control end of the sixth transistor T56 may receive an initialization signal INIT5. In the embodiment, a control end of the third transistor T53 and a control end of the fourth transistor T54 may receive a compensation signal COMP5. In the embodiment, a first end of the first capacitor C51 may receive an input signal Vi5. A first end of the second capacitor C52 may provide an output signal Vo5.

In the embodiment, the circled numbers in the figures may indicate different steps of the operation of the charge pump circuit 500, respectively. The arrows with the circled numbers in the figures may indicate the currents during a certain steps of the operation of the charge pump circuit 500, respectively. An arrow toward the first capacitor C51 may indicate charging the first capacitor C51, and an arrow away from the first capacitor C51 may indicate discharging the first capacitor C51.

In the embodiment, the step 1 to the step 3 may refer to the step 1 to step 3 of the second embodiment, while the details are not redundantly described seriatim herein. It should be noted that the reset signal RES5, the compensation signal COMP5, and the initialization signal INIT5 may be switched from a high voltage level to a low voltage level during the step 1, step 2 and step 3, respectively. Therefore, during the step 1, the first node N51 and the third node N53 may be reset to VL+|Vth51|, and the second node N52 may be reset to the reset voltage Vrst5. During the step 2, the second node N52 may be compensated to VL+|Vth51|+|Vth52|. During the step 3, the third node N53 may be initialized to the first reference voltage VH.

During the period of step 4, the input signal Vi5 may be switched from a high voltage level to a low voltage level, and the voltage difference between the low voltage level and the high voltage level may be an input voltage Vin. Since a voltage difference between the first end and the second end of the first capacitor C51 may maintain a constant value, the voltage of the first node N51 may be change from VL+|Vth51| to VL+|Vth51|−Vin. However, since the first node N51 is electrically connected to the first end of the second transistor T52, the voltage value of the first node N51 may be confined by the second transistor T52. That is, during the step 4, the voltage value of the first node N51 may be remained at VL+|Vth51| instead of VL+|Vth51|−Vin. The second transistor T52 and the third transistor T53 may be turned on. Therefore, an insufficient charge Q' may be charged into the first capacitor C51 based on the voltage difference. The value of the insufficient charge Q' may be equal to C51×(−Vin).

In the embodiment, the insufficient charge Q' may be transferred by a second transistor current I_T52 and a third transistor current I_T53 from the second capacitor C52 to the first capacitor C51 and thereby may discharge the second capacitor C52. That is, the value of the output signal Vo5 may be decreased by a value of a step voltage Vstep5 and the value of the step voltage Vstep5 may be equal to (C51/C52)×Vin. Therefore, the value of the output signal Vo5 may be decreased from the first reference voltage VH to VH−Vstep5.

During the period of step 5, the input signal Vi5 may be switched from the low voltage level to the high voltage level, and the voltage difference between the low voltage level and the high voltage level may be also the input voltage Vin. Since a voltage difference between the first end and the second end of the first capacitor C51 may maintain a constant value, the voltage of the first node N51 may be change from VL+|Vth51| to VL+|Vth51|+Vin. However, since the first node N51 is electrically connected to the second end of the first transistor T51, the voltage value of the first node N51 may be confined by the first transistor T51. That is, during the period of step 5, the voltage value of the first node N51 may be remained at VL+|Vth51| instead of VL+|Vth51|+Vin and the first transistor T51 may be turned on. Therefore, an extra charge Q may be discharged from the first capacitor C51 by the first transistor current I_T51 based on the voltage difference and may be equal to (−Q').

It should be noted that, the value of the output signal Vo5 may be decreased by the value of the step voltage Vstep5 during the step 4. That is, by repeating the step 4 and the step 5, the value of the output signal Vo5 may be decreased to a plurality of different values. Further, the plurality of different values are proportional to the number of repeating the step 4 and the step 5. That is, a variety of waveforms may be able to be output by the charge pump circuit 500 and the output is linear. Therefore, the charge pump circuit 500 may be used as a signal generator. In one embodiment, the charge pump circuit 500 may be used as a sweep signal generator for a pixel of a display device to implement an in-pixel sweep signal generator. Further, since the structure of the charge pump circuit 500 is simple, the charge pump circuit 500 may be disposed on the substrate and thereby an in-pixel sweep signal generator may be implemented.

Figure 6:
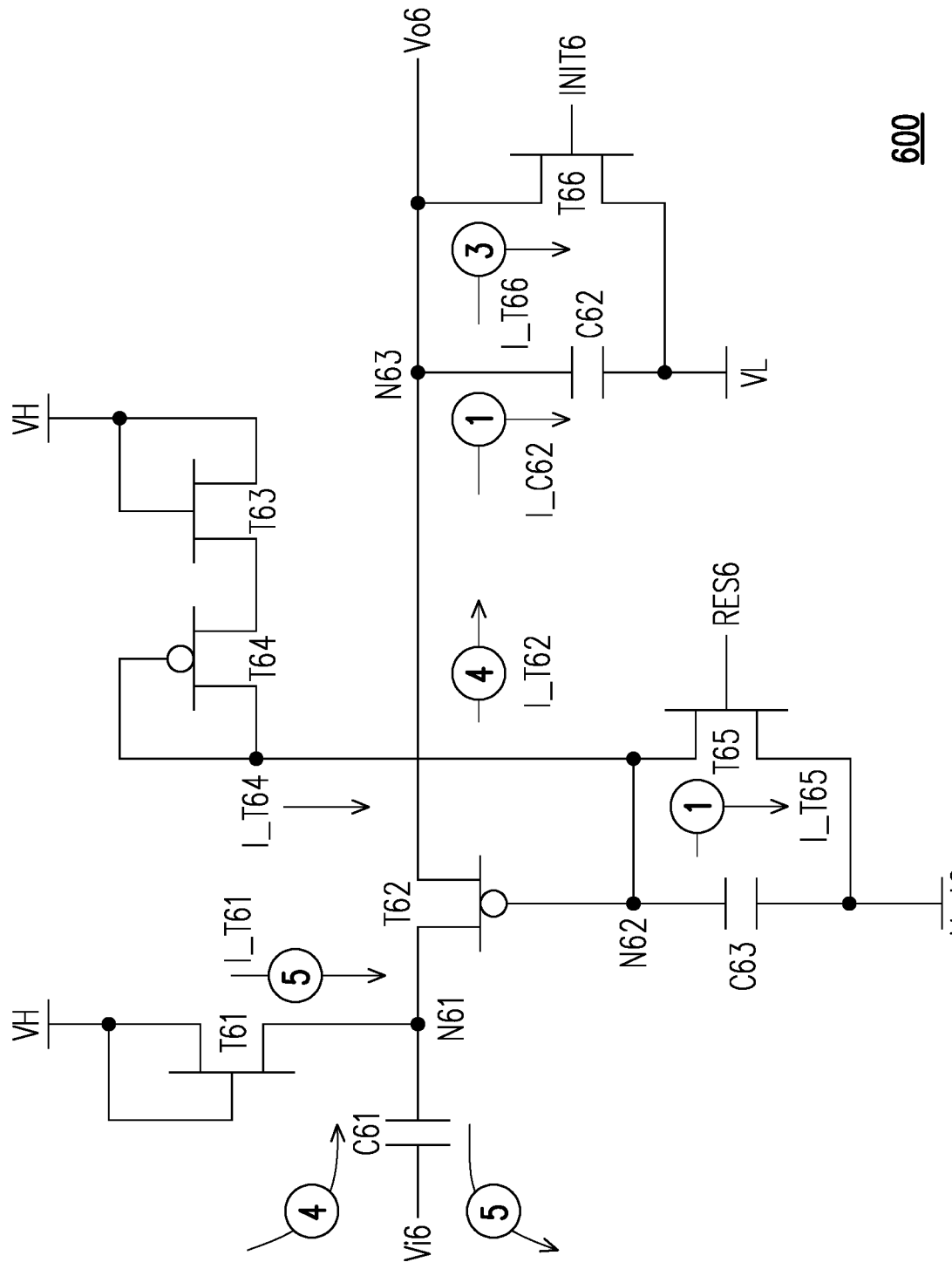
FIG. 6 is a schematic diagram of a charge pump circuit according to a third embodiment of the disclosure.

FIG. 6 is a schematic diagram of a charge pump circuit according to a third embodiment of the disclosure. Referring to FIG. 1 and FIG. 6, a charge pump circuit 600 may have a similar structure as the charge pump circuit 100. The charge pump circuit 600 may include a first transistor T61, a second transistor T62, a first capacitor C61, and a second capacitor C62. These elements may be referred to the charge pump circuit 100 and the details are not redundantly described seriatim herein.

In the embodiment, the charge pump circuit 600 may further include a third transistor T63, a fourth transistor T64, a fifth transistor T65, a sixth transistor T66, and a third capacitor C63. In the embodiment, the third transistor T63 may have a first end and a second end. The fourth transistor T64 may have a first end and a second end. The second end of the fourth transistor T64 may be electrically connected to the first end of the third transistor T63. The fifth transistor T65 may have a first end and a second end. The first end of the fifth transistor T65 may be electrically connected to the first end of the fourth transistor T64. The sixth transistor T66 may have a first end and a second end. The first end of the sixth transistor T65 may be electrically to the first end of the second capacitor C62. The second end of the sixth transistor T66 may be electrically to the second end of the second capacitor C62. The third capacitor C63 may have a first end and a second end. The first end of the third capacitor C63 may be electrically connected to the first end of the fifth transistor C65. The second end of the third capacitor C63 may be electrically connected to the second end of the fifth transistor C65.

In the embodiment, the second end of the first capacitor C61 may be indicated as a first node N61, the first end of the third capacitor C63 may be indicated as a second node N62, and a first end of the second capacitor C62 may be indicated as a third node N63. In the embodiment, the first transistor T61 may have a first threshold voltage Vth61, the second transistor T62 may have a second threshold voltage Vth62, the third transistor T63 may have a third threshold voltage Vth63, and the fourth transistor T64 may have a fourth threshold voltage Vth64. In the embodiment, the first threshold voltage Vth61 may be equal to the third threshold voltage Vth63, and the second threshold voltage Vth62 may be equal to the fourth threshold voltage Vth64, but this disclosure is not limited thereto. In the embodiment, the first end of the first transistor T61 and the second end of the third transistor T63 receive a first reference voltage VH. A second end of the second capacitor C62 receives a second reference voltage VL. A second end of the third capacitor C63 receives a reset voltage Vrst6.

In the embodiment, a control end of the fifth transistor T65 may receive a reset signal RES6. A control end of the sixth transistor T66 may receive an initialization signal INIT6. In the embodiment, the second end of the third transistor T63 may be electrically connected to a control end of the third transistor T63. The first end of the fourth transistor T64 may be electrically connected to a control end of the fourth transistor T64. In the embodiment, a first end of the first capacitor C61 may receive an input signal Vi6. A first end of the second capacitor C62 may provide an output signal Vo6.

In the embodiment, the circled numbers in the figures may indicate different steps of the operation of the charge pump circuit 600, respectively. The arrows with the circled numbers in the figures may indicate the currents during a certain steps of the operation of the charge pump circuit 600, respectively. An arrow toward the first capacitor C61 may indicate charging the first capacitor C61, and an arrow away from the first capacitor C61 may indicate discharging the first capacitor C61. In the embodiment, the step 1 and the step 3 may refer to the step 1 and step 3 of the second embodiment, while the details are not redundantly described seriatim herein. It should be noted that there is no need of step 2 in the embodiment due to the designated condition of the threshold voltages of the first transistor T61 to the fourth transistor T64. That is, the third transistor T63 and the fourth transistor T64 are designated to provide a fourth transistor current I_T64 for compensation. In addition, the reset signal RES6, and the initialization signal INIT6 may be switched from a low voltage level to a high voltage level during the periods of step 1 and step 3, respectively. Therefore, during the period of step 1, the first node N61 and the third node N63 may be reset to VH−|Vth61| by a second capacitor current I_C62, and the second node N62 may be reset to the reset voltage Vrst6 by a fifth transistor current I_T65. During the period of step 3, the third node N63 may be initialized to the second reference voltage VL by a sixth transistor current I_T66, and the second node N62 may be initialized to VH−|Vth61|−|Vth62|.

During the period of step 4, the input signal Vi6 may be switched from a low voltage level to a high voltage level, and the voltage difference between the low voltage level and the high voltage level may be an input voltage Vin. Since a voltage difference between the first end and the second end of the first capacitor C61 may maintain a constant value, the voltage of the first node N61 may be change from VH−|Vth61| to V1−|Vth61|+Vin. However, since the first node N61 is electrically connected to the first end of the second transistor T62, the voltage value of the first node N61 may be confined by the second transistor T62. That is, during the period of step 4, the voltage value of the first node N61 may be remained at VH−|Vth61| instead of VH−|Vth61|+Vin. The second transistor T62 may be turned on. Therefore, an extra charge Q may be discharged from the first capacitor C61 based on the voltage difference and may be equal to C61×Vin.

In the embodiment, the extra charge Q may be transferred by a second transistor current I_T62 from the first capacitor C61 to the second capacitor C62 and thereby may charge the second capacitor C62. That is, the value of the output signal Vo6 may be increased by a value of a step voltage Vstep6 and the value of the step voltage Vstep6 may be equal to (C61/C62)×Vin. Therefore, the value of the output signal Vo6 may be increased from the second reference voltage VL to VL+Vstep6.

During the period of step 5, the input signal Vi6 may be switched from the high voltage level to the low voltage level and the voltage difference between the low voltage level and the high voltage level may be also the input voltage Vin. Since a voltage difference between the first end and the second end of the first capacitor C61 may maintain a constant value, the voltage of the first node N61 may be change from VH−|Vth61| to VH−|Vth61|−Vin. However, since the first node N61 is electrically connected to the second end of the first transistor T61, the voltage value of the first node N61 may be confined by the first transistor T61. That is, during the period of step 5, the voltage value of the first node N61 may be remained at VH−|Vth61| instead of VH−|Vth61|−Vin and the first transistor T61 may be turned on. Therefore, an insufficient charge Q' may be charged into the first capacitor C61 by the first transistor current I_T61 based on the voltage difference and may be equal to (−Q).

It should be noted that, the value of the output signal Vo6 may be increased by the value of the step voltage Vstep6 during the step 4. That is, by repeating the step 4 and the step 5, the value of the output signal Vo4 may be increased to a plurality of different values. Further, the plurality of different values are proportional to the number of repeating the step 4 and the step 5. That is, a variety of waveforms may be able to be output by the charge pump circuit 600 and the output is linear. Therefore, the charge pump circuit 600 may be used as a signal generator. In one embodiment, the charge pump circuit 600 may be used as a sweep signal generator for a pixel of a display device to implement an in-pixel sweep signal generator. Further, since the structure of the charge pump circuit 600 is simple, the charge pump circuit 600 may be disposed on the substrate and thereby an in-pixel sweep signal generator may be implemented.

In the embodiment, the second transistor T62 is a P-type transistor, but this disclosure is not limited thereto. In the embodiment, the second transistor T62 may provide a charging current (the second transistor current I_T62) of the second capacitor C62 and thereby the charge pump circuit 600 may be a pump up circuit. In another embodiment, the second transistor T62 may be an N-type transistor, and thereby may provide a discharging current of the second capacitor C62. Therefore, the charge pump circuit 600 may become a pump down circuit.

Figure 7:
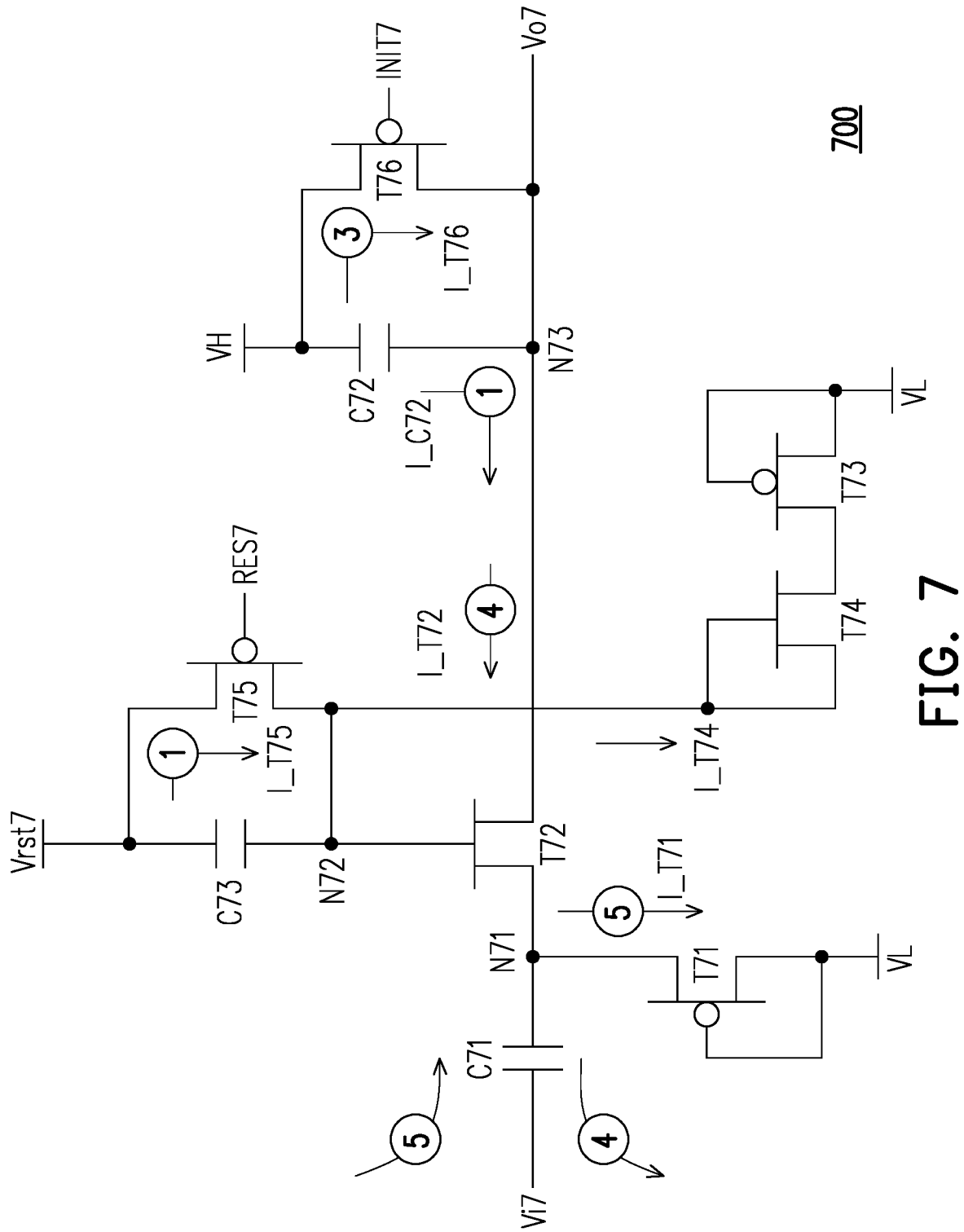
FIG. 7 is a schematic diagram of a charge pump circuit according to a modification of the third embodiment of the disclosure.

FIG. 7 is a schematic diagram of a charge pump circuit according to a modification of the third embodiment of the disclosure. Referring to FIG. 7, the main difference between FIG. 6 and FIG. 7 is that, the second transistor T62 of the charge pump circuit 600 is a P-type transistor and the second transistor T72 of the charge pump 700 is an N-type transistor. In the embodiment, the charge pump circuit 700 may include a first transistor T71, a second transistor T72, a first capacitor C71, and a second capacitor C72. These elements may be referred to the charge pump circuit 100 and the details are not redundantly described seriatim herein.

In the embodiment, the charge pump circuit 700 may further include a third transistor T73, a fourth transistor T74, a fifth transistor T75, a sixth transistor T76, and a third capacitor C73. In the embodiment, the third transistor T73 may have a first end and a second end. The first end of the third transistor T73 may be electrically connected to the second end of the fourth transistor T74. The third capacitor C73 may have a first end and a second end. The first end of the third capacitor C73 may be electrically connected to a control end of the second transistor T72. The fourth transistor T74 may have a first end and a second end. The fourth transistor T74 may be electrically connected between the control end of the second transistor T72 and the first end of the third transistor T73. The fifth transistor T75 may have a first end and a second end. The fifth transistor T75 may be electrically connected between the first end of the fourth transistor T74 and the second end of the third capacitor C73. The sixth transistor T76 may have a first end and a second end. The sixth transistor T76 may be electrically connected between the first end of the second capacitor C72 and the second end of the second capacitor C72.

In the embodiment, the second end of the first capacitor C71 may be indicated as a first node N71, the first end of the third capacitor C73 may be indicated as a second node N72, and a first end of the second capacitor C72 may be indicated as a third node N73. In the embodiment, the first transistor T71 may have a first threshold voltage Vth71, the second transistor T72 may have a second threshold voltage Vth72, the third transistor T73 may have a third threshold voltage Vth73, and the fourth transistor T74 may have a fourth threshold voltage Vth74. In the embodiment, the first threshold voltage Vth71 may be equal to the third threshold voltage Vth73, and the second threshold voltage Vth72 may be equal to the fourth threshold voltage Vth74, but this disclosure is not limited thereto.

In the embodiment, the first end of the first transistor T71, the control end of the third transistor T73 and the second end of the third transistor T73 receive a second reference voltage VL. A second end of the second capacitor C72 receives a first reference voltage VH. A second end of the third capacitor C73 receives a reset voltage Vrst7. In the embodiment, a control end of the fifth transistor T75 may receive a reset signal RES7. A control end of the sixth transistor T76 may receive an initialization signal INIT7. In the embodiment, a first end of the first capacitor C71 may receive an input signal Vi7. A first end of the second capacitor C72 may provide an output signal Vo7.

In the embodiment, the arrows with the circled numbers in the figures may indicate the currents during a certain steps of the operation of the charge pump circuit 700, respectively. An arrow toward the first capacitor C71 may indicate charging the first capacitor C71, and an arrow away from the first capacitor C71 may indicate discharging the first capacitor C71. In the embodiment, the step 1 and the step 3 may refer to the periods of step 1 and step 3 of the second embodiment, while the details are not redundantly described seriatim herein. It should be noted that there is no need of step 2 in the embodiment due to the designated condition of the threshold voltages of the first transistor T71 to the fourth transistor T74. That is, the third transistor T73 and the fourth transistor T74 are designated to provide a fourth transistor current I_T74 for compensation. In addition, the reset signal RES7, and the initialization signal INIT7 may be switched from a high voltage level to a low voltage level during the periods of step 1 and step 3, respectively. Therefore, during the period of step 1, the first node N71 and the third node N73 may be reset to VL+|Vth71| by a second capacitor current I_C72, and the second node N72 may be reset to the reset voltage Vrst7 by a fifth transistor current I_T75. During the period of step 3, the second node N72 may be initialized to VL+|Vth1|+|Vth2|.

During the period of step 4, the input signal Vi7 may be switched from a high voltage level to a low voltage level and the voltage difference between the low voltage level and the high voltage level may be an input voltage Vin. Since a voltage difference between the first end and the second end of the first capacitor C71 may maintain a constant value, the voltage of the first node N71 may be change from VL+|Vth71| to VL+|Vth71|−Vin. However, since the first node N71 is electrically connected to the first end of the second transistor T72, the voltage value of the first node N71 may be confined by the second transistor T72. That is, during the step 4, the voltage value of the first node N71 may be remained at VL+|Vth71| instead of VL+|Vth71|−Vin. The second transistor T72 may be turned on. Therefore, an insufficient charge Q' may be charged into the first capacitor C71 based on the voltage difference. The value of the insufficient charge Q' may be equal to C71×(−Vin).

In the embodiment, the insufficient charge Q' may be transferred by a second transistor current I_T72 from the second capacitor C72 to the first capacitor C71 and thereby may discharge the second capacitor C72. That is, the value of the output signal Vo7 may be decreased by a value of a step voltage Vstep7 and the value of the step voltage Vstep7 may be equal to (C71/C72)×Vin. Therefore, the value of the output signal Vo7 may be decreased from the first reference voltage VH to VH−Vstep7.

During the period of step 5, the input signal Vi7 may be switched from the low voltage level to the high voltage level, and the voltage difference between the low voltage level and the high voltage level may be also the input voltage Vin. Since a voltage difference between the first end and the second end of the first capacitor C71 may maintain a constant value, the voltage of the first node N71 may be change from VL+|Vth71| to VL+|Vth71|+Vin. However, since the first node N71 is electrically connected to the second end of the first transistor T71, the voltage value of the first node N71 may be confined by the first transistor T71. That is, during the step 5, the voltage value of the first node N71 may be remained at VL+|Vth71| instead of VL+|Vth71|+Vin and the first transistor T71 may be turned on. Therefore, an extra charge Q may be discharged from the first capacitor C71 by the first transistor current I_T71 based on the voltage difference and may be equal to (−Q').

It should be noted that, the value of the output signal Vo7 may be decreased by the value of the step voltage Vstep7 during the period of step 4. That is, by repeating the step 4 and the step 5, the value of the output signal Vo7 may be decreased to a plurality of different values. Further, the plurality of different values are proportional to the number of repeating the step 4 and the step 5. That is, a variety of waveforms may be able to be output by the charge pump circuit 700 and the output is linear. Therefore, the charge pump circuit 700 may be used as a signal generator. In one embodiment, the charge pump circuit 700 may be used as a sweep signal generator for a pixel of a display device to implement an in-pixel sweep signal generator. Further, since the structure of the charge pump circuit 700 is simple, the charge pump circuit 700 may be disposed on the substrate and thereby an in-pixel sweep signal generator may be implemented.

Figure 8:
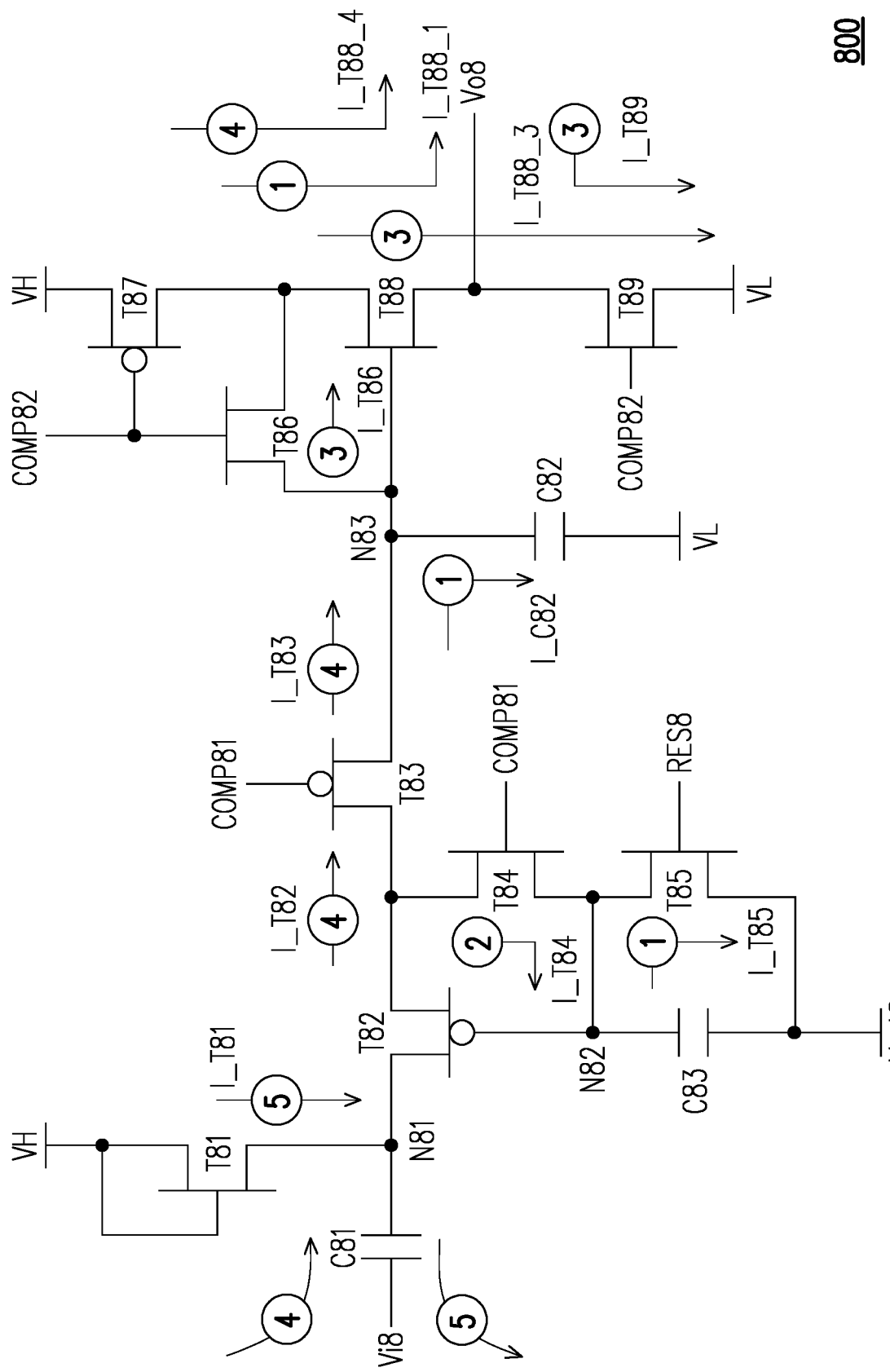
FIG. 8 is a schematic diagram of a charge pump circuit according to a fourth embodiment of the disclosure.

FIG. 8 is a schematic diagram of a charge pump circuit according to a fourth embodiment of the disclosure. Referring to FIG. 1 and FIG. 8, a charge pump circuit 800 may have a similar structure as the charge pump circuit 100. The charge pump circuit 800 may include a first transistor T81, a second transistor T82, a first capacitor C81, and a second capacitor C82. These elements may be referred to the charge pump circuit 100 and the details are not redundantly described seriatim herein.

In the embodiment, the charge pump circuit 800 may further include a third transistor T83, a fourth transistor T84, a fifth transistor T85, a sixth transistor T86, a seventh transistor T87, an eighth transistor T88, a ninth transistor T89 and a third capacitor C83. In the embodiment, the third transistor T83 may have a first end and a second end. The third transistor T83 may be electrically connected between the second end of the second transistor T82 and the first end of the second capacitor C82. The third capacitor C83 may have a first end and a second end. The first end of the third capacitor C83 may be electrically connected to a control end of the second transistor T82. The fourth transistor T84 may have a first end and a second end. The fourth transistor T84 may be electrically connected between the second end of the second transistor T82 and the first end of the third capacitor C83. The fifth transistor T85 may have a first end and a second end. The fifth transistor T85 may be electrically connected between the second end of the fourth transistor T84 and the second end of the third capacitor C83. The sixth transistor T86 may have a first end and a second end. The first end of the sixth transistor T86 may be electrically connected to the first end of the second capacitor C82. The seventh transistor T87 may have a first end and a second end. The second end of the seventh transistor T87 may be electrically connected to the second end of the sixth transistor T86. The eighth transistor T88 may have a first end and a second end. The first end of the eighth transistor T88 may be electrically connected to the second end of the seventh transistor T87. The ninth transistor T89 may have a first end and a second end. The first end of the ninth transistor T89 may be electrically connected to the second end of the eighth transistor T88.

In the embodiment, the second end of the first capacitor C81 may be indicated as a first node N81, the first end of the third capacitor C83 may be indicated as a second node N82, and a first end of the second capacitor C82 may be indicated as a third node N83. In the embodiment, the first transistor T81 may have a first threshold voltage Vth81, the second transistor T82 may have a second threshold voltage Vth82, and the eighth transistor T88 may have an third threshold voltage Vth83. In the embodiment, the first end of the first transistor T81 and the first end of the seventh transistor T87 receive a first reference voltage VH. A second end of the second capacitor C82 and the second end of the ninth transistor T89 receive a second reference voltage VL. A second end of the third capacitor C83 receives a reset voltage Vrst8.

In the embodiment, a control end of the fifth transistor T85 may receive a reset signal RES8. In the embodiment, a control end of the third transistor T83 and a control end of the fourth transistor T84 may receive a first compensation signal COMP81. A control end of the sixth transistor T86, a control end of the seventh transistor T87, and a control end of the ninth transistor T89 may receive a second compensation signal COMP82. In the embodiment, a first end of the first capacitor C81 may receive an input signal Vi8. The second end of the eighth transistor T88 may provide an output signal Vo8.

Figure 9:
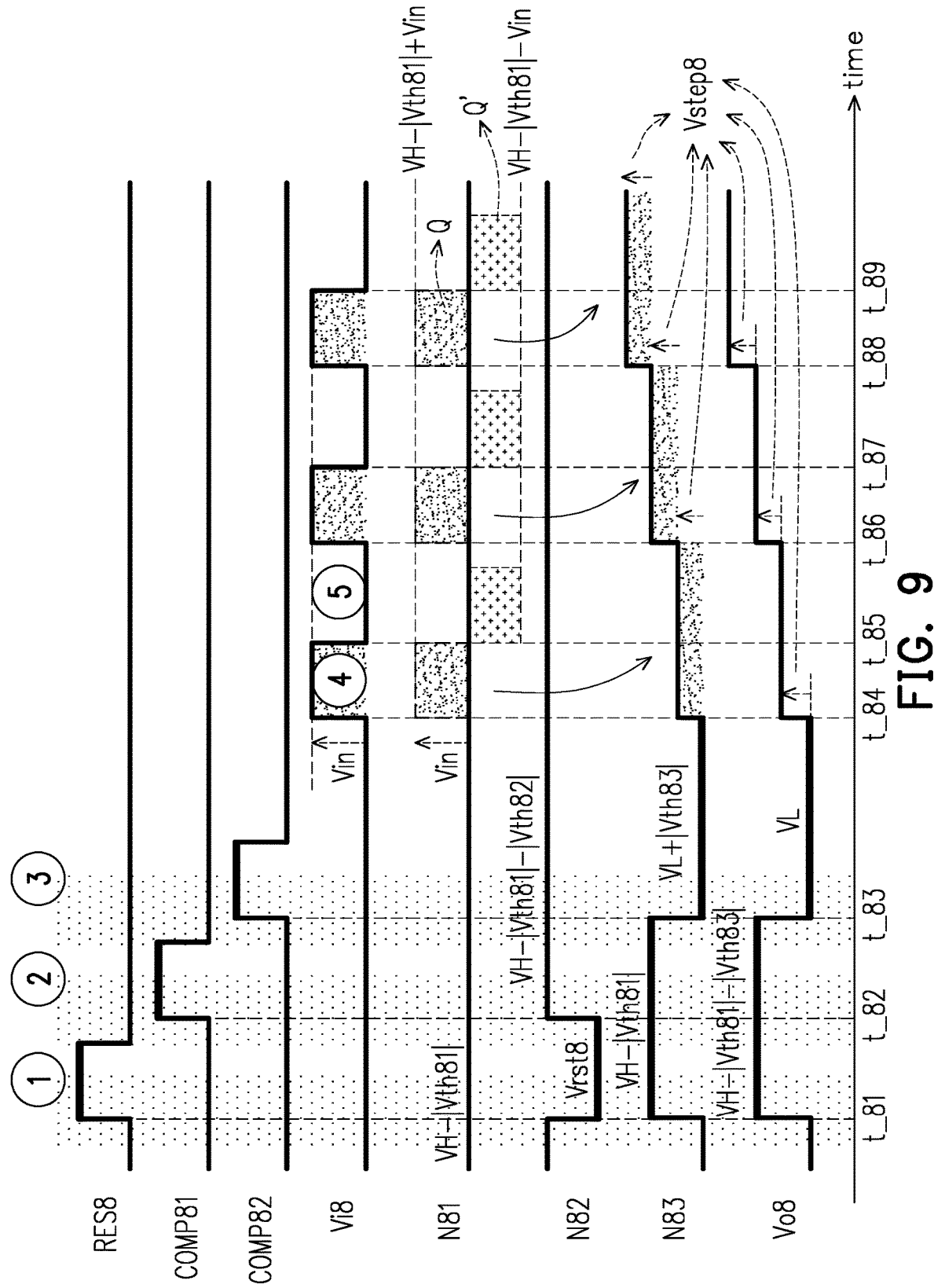
FIG. 9 is a schematic signal timing chart of the charge pump circuit according to the fourth embodiment of the disclosure.

FIG. 9 is a schematic signal timing chart of the charge pump circuit according to the fourth embodiment of the disclosure. Referring to FIG. 8 and FIG. 9, the circled numbers in the figures may indicate different steps of the operation of the charge pump circuit 800, respectively. The arrows with the circled numbers in the figures may indicate the currents during a certain steps of the operation of the charge pump circuit 800, respectively. An arrow toward the first capacitor C81 may indicate charging the first capacitor C81, and an arrow away from the first capacitor C81 may indicate discharging the first capacitor C81. In the embodiment, the step 1 and the step 2 may refer to the step 1 and step 2 of the second embodiment, while the details are not redundantly described seriatim herein. In the embodiment, the reset signal RES8, the first compensation signal COMP81, the second compensation signal COMP82 may be switched from a low voltage level to a high voltage level during the periods of step 1, step 2, and step 3, respectively. Therefore, during the period of step 1, the first node N81 and the third node N83 may be reset to VH−|Vth81| by a second capacitor current I_C82, the second node N82 may be reset to the reset voltage Vrst8 by a fifth transistor current I_T85, and the output signal Vo8 may be reset to VH−|Vth81|−|Vth83| by an eighth transistor step one current I_T88_1. During the period of step 2, the second node N82 may be compensated to VH−|Vth81|−|Vth82| by a fourth transistor current I_T84. During the period of step 3, the third node N83 may be compensated to VL+|Vth83| by a sixth transistor current I_T86, and the output signal Vo8 may be compensated to the second reference voltage VL by an eighth transistor step three current I_T88_3 and a ninth transistor current I_T89.

During the step 4, the input signal Vi8 may be switched from a low voltage level to a high voltage level, and the voltage difference between the low voltage level and the high voltage level may be an input voltage Vin. Since a voltage difference between the first end and the second end of the first capacitor C81 may maintain a constant value, the voltage of the first node N81 may be change from VH−|Vth81| to VH−|Vth81|+Vin. However, since the first node N81 is electrically connected to the first end of the second transistor T82, the voltage value of the first node N81 may be confined by the second transistor T82. That is, during the period of step 4, the voltage value of the first node N81 may be remained at VH−|Vth81| (the solid line of N81 in FIG. 9) instead of VH−|Vth81|+Vin (the dashed line of N81 in FIG. 9). The second transistor T82 and the third transistor T83 may be turned on. Therefore, an extra charge Q may be discharged from the first capacitor C81 based on the voltage difference and may be equal to C81×Vin.

In the embodiment, the extra charge Q may be transferred by a second transistor current I_T82 and a third transistor current I_T83 from the first capacitor C81 to the second capacitor C82 and thereby may charge the second capacitor C82. In addition, the voltage value of the output signal Vo8 may be obtained by subtracting the third threshold voltage Vth83 from the voltage value of the third node N83. That is, the value of the output signal Vo8 may be increased by a value of a step voltage Vstep8 and the value of the step voltage Vstep8 may be equal to (C81/C82)×Vin. Therefore, the value of the output signal Vo8 may be increased from the second reference voltage VL to VL+Vstep8 by an eighth transistor step four current I_T88_4.

During the period of step 5, the input signal Vi8 may be switched from the high voltage level to the low voltage level and the voltage difference between the low voltage level and the high voltage level may be also the input voltage Vin. Since a voltage difference between the first end and the second end of the first capacitor C81 may maintain a constant value, the voltage of the first node N81 may be change from VH−|Vth81| to VH−|Vth81|−Vin. However, since the first node N81 is electrically connected to the second end of the first transistor T81, the voltage value of the first node N81 may be confined by the first transistor T81. That is, during the period of step 5, the voltage value of the first node N81 may be remained at VH−|Vth81| instead of VH−|Vth81|−Vin and the first transistor T81 may be turned on. Therefore, an insufficient charge Q' may be charged into the first capacitor C81 by the first transistor current I_T81 based on the voltage difference and may be equal to (−Q).

It should be noted that, the value of the output signal Vo8 may be increased by the value of the step voltage Vstep8 during the step 4. That is, by repeating the step 4 and the step 5, the value of the output signal Vo8 may be increased to a plurality of different values. Further, the plurality of different values are proportional to the number of repeating the step 4 and the step 5. That is, a variety of waveforms may be able to be output by the charge pump circuit 800 and the output is linear. Therefore, the charge pump circuit 800 may be used as a signal generator. In one embodiment, the charge pump circuit 800 may be used as a sweep signal generator for a pixel of a display device to implement an in-pixel sweep signal generator. Further, since the structure of the charge pump circuit 800 is simple, the charge pump circuit 800 may be disposed on the substrate and thereby an in-pixel sweep signal generator may be implemented.

In the embodiment, the second transistor T82 is a P-type transistor, but this disclosure is not limited thereto. In the embodiment, the second transistor T82 may provide a charging current (the second transistor current I_T82) of the second capacitor C82 and thereby the charge pump circuit 800 may be a pump up circuit. In another embodiment, the second transistor T82 may be an N-type transistor, and thereby may provide a discharging current of the second capacitor C82. Therefore, the charge pump circuit 800 may become a pump down circuit.

In the embodiment, a difference between FIG. 3 and FIG. 8 is that, the output signal Vo3 may be provided through the first end of the second capacitor C32, but the output signal Vo8 may be provide through the second end of the eighth transistor T88. That is, the output signal Vo8 may depend on the eighth transistor T88 instead of a capacitor.

Figure 10:
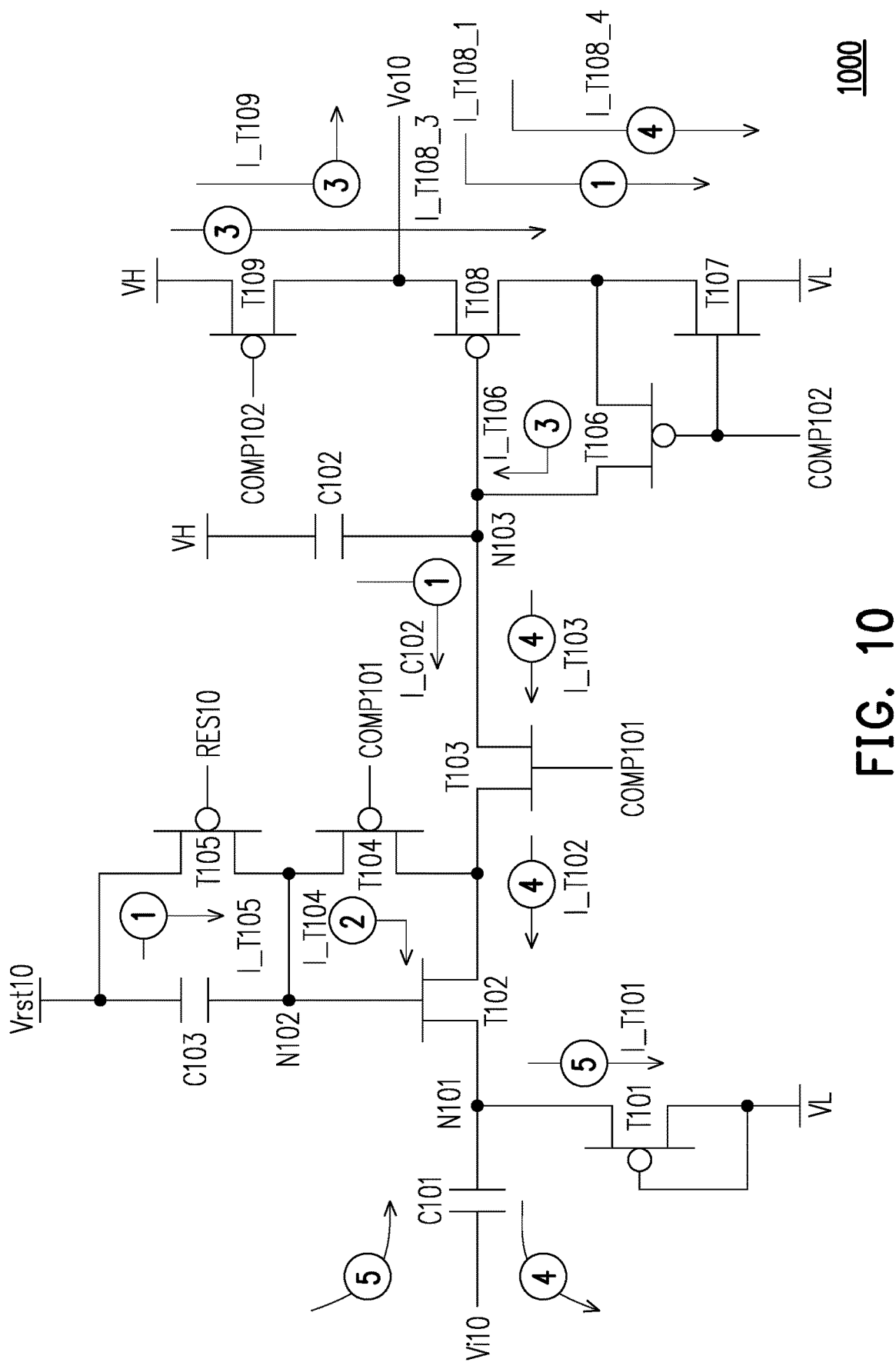
FIG. 10 is a schematic diagram of a charge pump circuit according to a modification of the fourth embodiment of the disclosure.

FIG. 10 is a schematic diagram of a charge pump circuit according to a modification of the fourth embodiment of the disclosure. Referring to FIG. 8, the main difference between FIG. 8 and FIG. 10 is that, the second transistor T82 of the charge pump circuit 800 is a P-type transistor and the second transistor T102 of the charge pump 1000 is an N-type transistor. In the embodiment, the charge pump circuit 1000 may include a first transistor T101, a second transistor T102, a first capacitor C101, and a second capacitor C102. These elements may be referred to the charge pump circuit 100 and the details are not redundantly described seriatim herein.

In the embodiment, the charge pump circuit 1000 may further include a third transistor T103, a fourth transistor T104, a fifth transistor T105, a sixth transistor T106, a seventh transistor T107, an eighth transistor T108, a ninth transistor T109 and a third capacitor C103. In the embodiment, the third transistor T103 may have a first end and a second end. The third transistor T103 may be electrically connected between the second end of the second transistor T102 and the first end of the second capacitor C102. The third capacitor C103 may have a first end and a second end. The first end of the third capacitor C103 may be electrically connected to a control end of the second transistor T102. The fourth transistor T104 may have a first end and a second end. The fourth transistor T104 may be electrically connected between the control end of the second transistor T102 and the first end of the third transistor T103. The fifth transistor T105 may have a first end and a second end. The fifth transistor T105 may be electrically connected between the second end of the fourth transistor T104 and the second end of the third capacitor C103. The sixth transistor T106 may have a first end and a second end. The first end of the sixth transistor T106 may be electrically connected to the first end of the second capacitor C102. The seventh transistor T107 may have a first end and a second end. The second end of the seventh transistor T107 may be electrically connected to the second end of the sixth transistor T106. The eighth transistor T108 may have a first end and a second end. The first end of the eighth transistor T108 may be electrically connected to the second end of the seventh transistor T107. The ninth transistor T109 may have a first end and a second end. The first end of the ninth transistor T109 may be electrically connected to the second end of the eighth transistor T108.

In the embodiment, the second end of the first capacitor C101 may be indicated as a first node N101, the first end of the third capacitor C103 may be indicated as a second node N102, and a first end of the second capacitor C102 may be indicated as a third node N103. In the embodiment, the first transistor T101 may have a first threshold voltage Vth101, the second transistor T102 may have a second threshold voltage Vth102, and the eighth transistor T108 may have an third threshold voltage Vth103. In the embodiment, the first end of the first transistor T101 and the first end of the seventh transistor T107 receive a second reference voltage VL. A second end of the second capacitor C102 and the second end of the ninth transistor T109 receive a first reference voltage VH. A second end of the third capacitor C103 receives a reset voltage Vrst10.

In the embodiment, a control end of the fifth transistor T105 may receive a reset signal RES10. In the embodiment, a control end of the third transistor T103 and a control end of the fourth transistor T104 may receive a first compensation signal COMP101. A control end of the sixth transistor T106, a control end of the seventh transistor T107, and a control end of the ninth transistor T109 may receive a second compensation signal COMP102. In the embodiment, a first end of the first capacitor C101 may receive an input signal Vi10. A first end of the eighth transistor T108 may provide an output signal Vo10.

In the embodiment, the circled numbers in the figures may indicate different steps of the operation of the charge pump circuit 1000, respectively. The arrows with the circled numbers in the figures may indicate the currents during a certain steps of the operation of the charge pump circuit 1000, respectively. An arrow toward the first capacitor C101 may indicate charging the first capacitor C101, and an arrow away from the first capacitor C101 may indicate discharging the first capacitor C101.

In the embodiment, the step 1 and the step 2 may refer to the step 1 and step 2 of the second embodiment, while the details are not redundantly described seriatim herein. In the embodiment, the reset signal RES10, the first compensation signal COMP101, the second compensation signal COMP102 may be switched from a high voltage level to a low voltage level during the periods of step 1, step 2, and step 3, respectively. Therefore, during the period of step 1, the first node N101 and the third node N103 may be reset to VL+|Vth101| by a second capacitor current I_C102, the second node N102 may be reset to the reset voltage Vrst10 by a fifth transistor current I_T105, and the output signal Vo10 may be reset to VL+|Vth01|+|Vth103| by an eighth transistor step one current I_108_1. During the period of step 2, the second node N102 may be compensated to VL+|Vth101|+|Vth102| by a fourth transistor current I_T104. During the period of step 3, the third node N103 may be compensated to VH−|Vth103| by a sixth transistor current I_T106, and the output signal may be compensated to the first reference voltage VH by an eighth transistor step three current I_T108_3 and a ninth transistor current I_T109.

During the period of step 4, the input signal Vi10 may be switched from a high voltage level to a low voltage level and the voltage difference between the low voltage level and the high voltage level may be an input voltage Vin. Since a voltage difference between the first end and the second end of the first capacitor C101 may maintain a constant value, the voltage of the first node N101 may be change from VL+|Vth101| to V1+|Vth101|−Vin. However, since the first node N101 is electrically connected to the first end of the second transistor T102, the voltage value of the first node N101 may be confined by the second transistor T102. That is, during the period of step 4, the voltage value of the first node N101 may be remained at VL+|Vth101|instead of VL+|Vth101|−Vin. The second transistor T102 and the third transistor T103 may be turned on. Therefore, an insufficient charge Q may be charged into the first capacitor C101 based on the voltage difference and may be equal to C101×(−Vin).

In the embodiment, the insufficient charge Q may be transferred by a second transistor current I_T102 and a third transistor current I_T103 to the first capacitor C101 from the second capacitor C102 and thereby may discharge the second capacitor C102. In addition, the voltage value of the output signal Vo10 may be obtained by adding the third threshold voltage Vth103 to the voltage value of the third node N103. That is, the value of the output signal Vo10 may be decreased by a value of a step voltage Vstep10 and the value of the step voltage Vstep10 may be equal to (C101/C102)×Vin. Therefore, the value of the output signal Vo10 may be decreased from the second reference voltage VL to VL−Vstep10.

During the period of step 5, the input signal Vi10 may be switched from the low voltage level to the high voltage level and the voltage difference between the low voltage level and the high voltage level may be also the input voltage Vin. Since a voltage difference between the first end and the second end of the first capacitor C101 may maintain a constant value, the voltage of the first node N101 may be change from VL+|Vth101| to VL+|Vth101|+Vin. However, since the first node N101 is electrically connected to the second end of the first transistor T101, the voltage value of the first node N101 may be confined by the first transistor T101. That is, during the period of step 5, the voltage value of the first node N101 may be remained at VL+|Vth101| instead of VL+|Vth101|+Vin and the first transistor T101 may be turned on. Therefore, an extra charge Q' may be discharged from the first capacitor C101 by the first transistor current I_T101 based on the voltage difference and may be equal to (−Q).

It should be noted that, the value of the output signal Vo10 may be decreased by the value of the step voltage Vstep10 during the period of step 4. That is, by repeating the step 4 and the step 5, the value of the output signal Vo10 may be decreased to a plurality of different values. Further, the plurality of different values are proportional to the number of repeating the step 4 and the step 5. That is, a variety of waveforms may be able to be output by the charge pump circuit 1000 and the output is linear. Therefore, the charge pump circuit 1000 may be used as a signal generator. In one embodiment, the charge pump circuit 1000 may be used as a sweep signal generator for a pixel of a display device to implement an in-pixel sweep signal generator. Further, since the structure of the charge pump circuit 1000 is simple, the charge pump circuit 1000 may be disposed on the substrate and thereby an in-pixel sweep signal generator may be implemented.

Figure 11A:
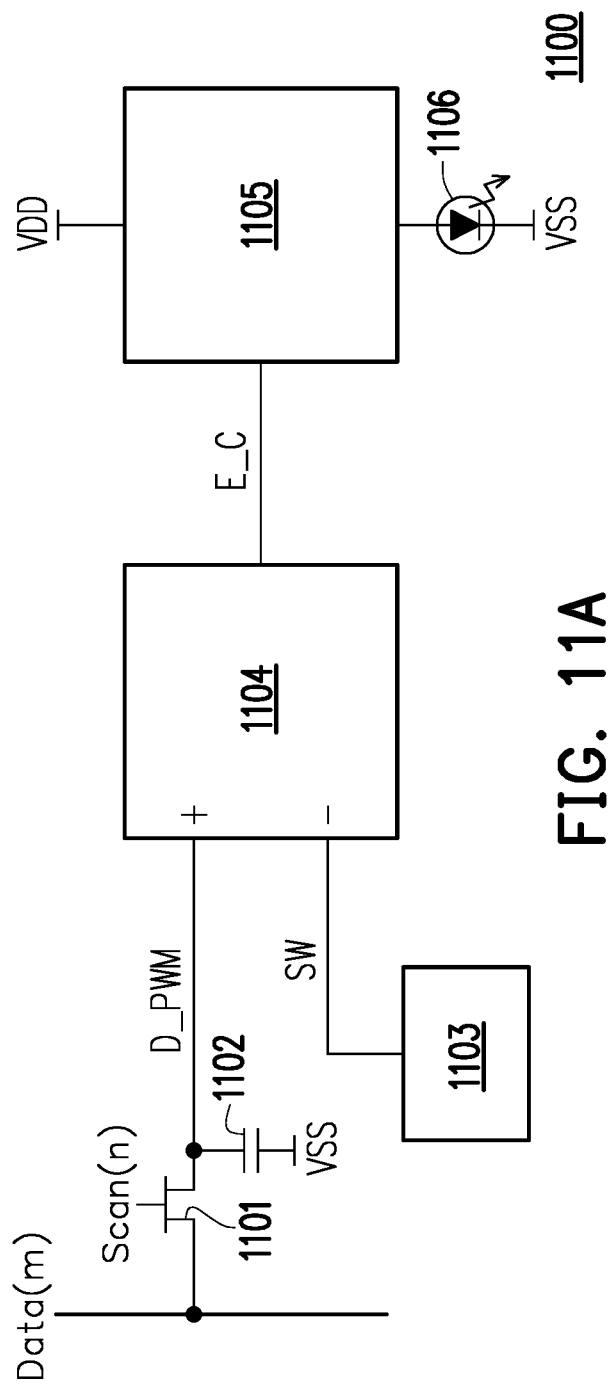
FIG. 11A is a schematic block diagram of a pixel circuit for AM-LED display panel according to one embodiment of the disclosure.

FIG. 11A is a schematic block diagram of a pixel circuit for AM-LED display panel according to one embodiment of the disclosure. Referring to FIG. 11A, a pixel circuit 1100 may include a charge pump circuit 1103, a comparator 1104, a current generator 1105, a light emitting diode 1106, a capacitor 1102, and a scan transistor 1101. In the embodiment, the current generator 1105 may receive a first reference voltage VDD. The capacitor 1102 may have a first end and a second end. The scan transistor 1101 may have a first end and a second end. The first end of the capacitor 1102 may be electrically connected to the second end of the scan transistor 1101. The second end of the capacitor 1102 may receive a second reference voltage VSS. The first end of the scan transistor 1101 may be electrically connected to a data line Data(m) of a plurality of data lines. A control end of the scan transistor 1101 may be electrically connected to a scan line Scan(n) of a plurality of scan lines. The comparator 1104 may have a positive end and a negative end. The second end of the scan transistor 1101 may be electrically connected to the positive end of the comparator 1104 to provide a pulse width modulation data D_PWM. The charge pump circuit 1103 may be electrically connected to the negative end of the comparator 1104 to provide a sweep signal SW. An output end of the comparator 1104 may be electrically connected to the current generator 1105 to provide an emission control signal E_C. The light emitting diode 1106 may receive the second reference voltage VSS and be electrically connected to the current generator 1105.

Figure 11B:
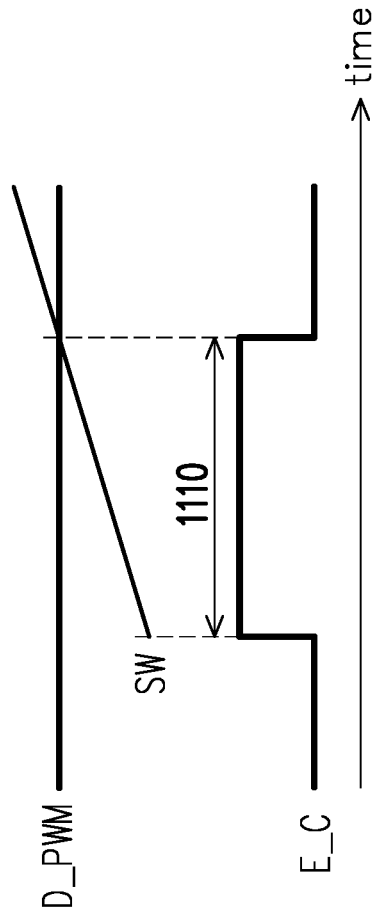
FIG. 11B is a schematic signal timing chart of a pixel circuit for AM-LED display panel according to one embodiment of the disclosure.

FIG. 11B is a schematic signal timing chart of a pixel circuit for AM-LED display panel according to one embodiment of the disclosure. Referring to FIG. 11A and FIG. 11B, the comparator 1104 may be configured to output the emission control signal E_C according to the pulse width modulation data D_PWM and the sweep signal SW. In the embodiment, before an emission period 1110, the comparator 1104 may be configured to output a low voltage level while there is not input of the sweep signal SW. During the emission period 1110, the comparator 1104 may be configured to output a high voltage level while the value of the pulse width modulation data D_PWM is greater than the value the sweep signal SW. After the emission period 1110, the comparator 1104 may be configured to output the low voltage level while the value of the pulse width modulation data D_PWM is smaller than the value the sweep signal SW. In the embodiment, the sweep signal SW may be a linear signal increasing with time, and the linear signal may be with a specific slope. In the embodiment, the charge pump circuit 1103 may be implemented by one of the charge pump circuits 100, 300, 500, 600, 700, 800, 1000 of the above embodiments of FIG. 1, FIG. 3, FIG. 5 to FIG. 8, and FIG. 10. Therefore, the specific slope may be determined by a step voltage of the charge pump circuit 1103. Since the structure of the charge pump circuit 1103 is simple, the charge pump circuit 1103 may be disposed on the substrate of the AM-LED display panel and thereby an in-pixel sweep signal generator may be implemented.

FIG. 12A is a schematic block diagram of a pixel circuit for photon counting detector according to one embodiment of the disclosure. Referring to FIG. 12A, a pixel circuit for photon counting detector may include a photo detector 1201, a pulse shaper 1202, a first comparator 1203, a second comparator 1204, a first counter 1205, a second counter 1206, a first scan transistor 1207, and a second transistor 1208. In the embodiment, the photo detector 1201 may be configured to detect a light L and generate a photo detector current I_PD according to the light L. In the embodiment, the light L may be an X-ray for computed tomography, but the disclosure is not limited thereto.

In the embodiment, the pulse shaper 1202 may be configured to generate an input signal 1210 according to the photo detector current I_PD. The first comparator 1203 may have a positive end and a negative end. The second comparator 1204 may have a positive end and a negative end. The positive end of the first comparator 1203 and the positive end of the second comparator 1204 may receive the input signal 1210. The negative end of the first comparator 1203 may receive a first reference signal Ref1. The negative end of the second comparator 1204 may receive a second reference signal Ref2. The first comparator 1203 may be configured to output a first comparison signal 1220 according to the input signal and the first reference signal Ref1. The second comparator 1204 may be configured to output a second comparison signal 1230 according to the input signal and the second reference signal Ref2.

In the embodiment, the first counter 1205 may be configured to output a first count signal 1240 according to the first comparison signal. The second counter 1206 may be configured to output a second count signal 1250 according to the second comparison signal. The first scan transistor 1207 may have a first end and a second end. The second scan transistor 1208 may have a first end and a second end. A control end of the first scan transistor 1207 may be electrically connected to a first scan line Scan1(n) of a plurality of scan lines. A control end of the second scan transistor 1208 may be electrically connected to a second scan line Scan2(n) of a plurality of scan lines. The second end of the first scan transistor 1207 and the second end of the second scan transistor 1208 may be electrically connected to a sense line Sense(m) of a plurality of sense lines.

FIG. 12B is a schematic input signal of the comparators of a pixel circuit for photon counting detector according to one embodiment of the disclosure. FIG. 12C is schematic output signals of the comparators of a pixel circuit for photon counting detector according to one embodiment of the disclosure. FIG. 12D is schematic output signals of the counters of a pixel circuit for photon counting detector according to one embodiment of the disclosure. Referring to FIG. 12A to FIG. 12D, the pulse shaper 1202 may be configured to generate an input signal 1210 according to the photo detector current I_PD. The input signal 1210 may be compared with the first reference signal Ref1 by the first comparator 1203 to obtain a first comparison signal 1220. The input signal 1210 may be compared with the second reference signal Ref2 by the second comparator 1204 to obtain a second comparison signal 1230.

In the embodiment, the first comparator 1203 and the second 1204 may output a high voltage level while the input signal 1210 is greater than the value of the first reference signal Ref1 or the second reference signal Ref2, respectively. The first comparator 1203 and the second 1204 may output a low voltage level while the input signal 1210 is less than the value of the first reference signal Ref1 or the second reference signal Ref2, respectively.

In the embodiment, there is only one value of the peaks of the input signal 1210 is greater than the value of the first reference signal Ref1. Therefore, the first comparison signal 1220 may include one square wave. In the embodiment, there are three values of the peaks of the input signal 1210 are greater than the value of the second reference signal Ref2. Therefore, the second comparison signal 1230 may include three square waves. That is, the number of the square waves of the first comparison signal 1220 and the number of the square waves of the second comparison signal 1230 are determined according to the input signal 1210, the first reference signal Ref1, and the second reference signal Ref2, respectively.

In the embodiment, the first counter 1205 and the second counter 1206 may be implemented by one of the charge pump circuits 100, 300, 500, 600, 700, 800, and 1000 of the above embodiments of FIG. 1, FIG. 3, FIG. 5 to FIG. 8, and FIG. 10, respectively. The first counter 1205 may be configured to output a first count signal 1240 according to the number of the square waves of the first comparison signal 1220. The second counter 1206 may be configured to output a second count signal 1250 according to the number of the square waves of the second comparison signal 1230. Therefore, the pixel circuit 1200 may detect the number of the photos of the light L and an in-pixel photo counting detector may be implemented.

Figure 13:
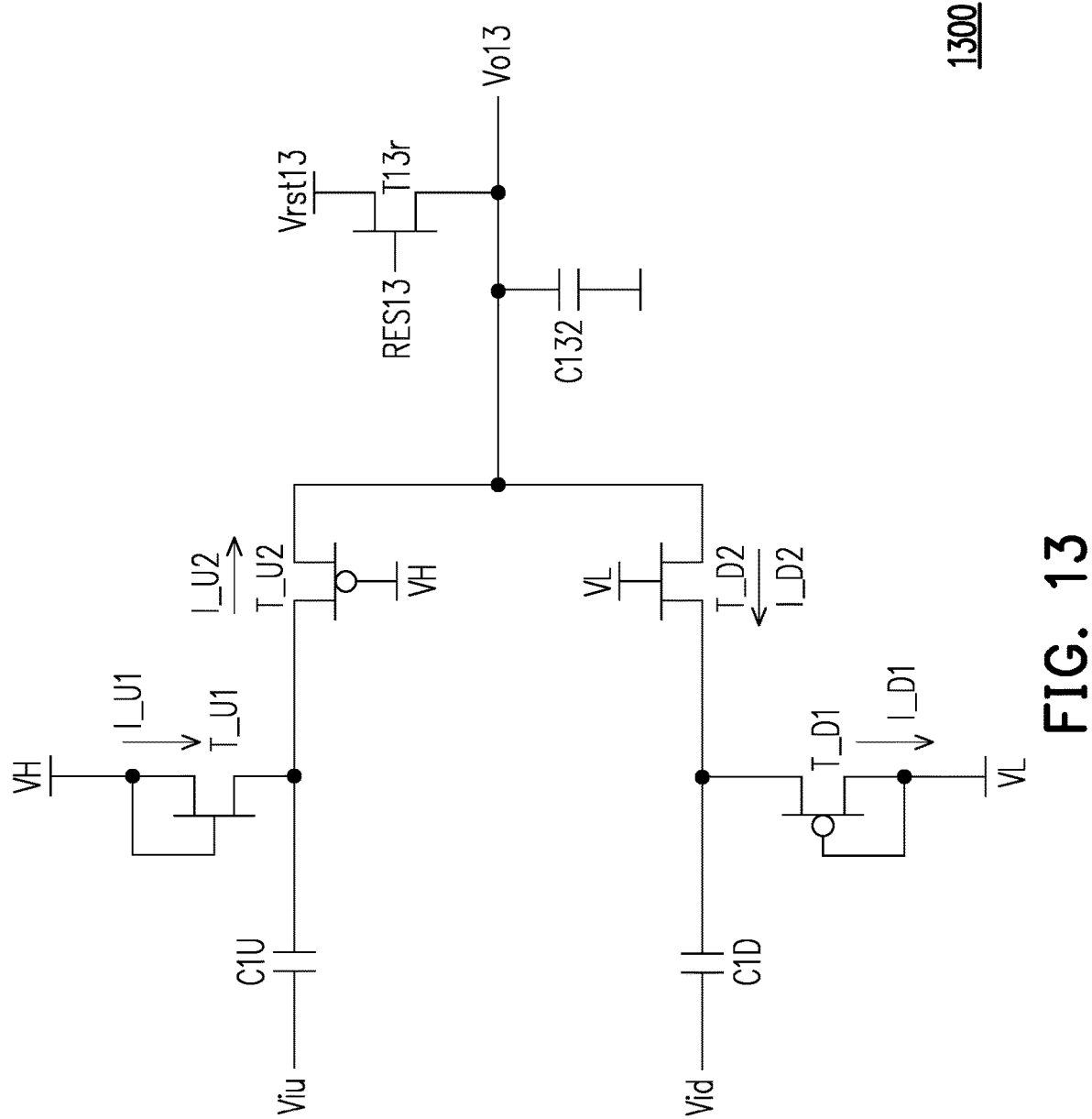
FIG. 13 is a schematic diagram of an arbitrary waveform generator according to one embodiment of the disclosure.

FIG. 13 is a schematic diagram of an arbitrary waveform generator according to one embodiment of the disclosure. Referring to FIG. 13, an arbitrary waveform generator 1300 may include a first up transistor T_U1, a second up transistor T_U2, a first down transistor T_D1, a second down transistor T_D2, a reset transistor T13r, a first up capacitor C1U, a first down capacitor C1D, and a second capacitor C132. In the embodiment, the first up transistor T_U1 may have a first end and a second end. The second up transistor T_U2 may have a first end and a second end. The first down transistor T_D1 may have a first end and a second end. The second down transistor T_D2 may have a first end and a second end. The reset transistor T13r may have a first end and a second end. The first up capacitor C1U may have a first end and a second end. The first down capacitor C1D may have a first end and a second end. The second capacitor C132 may have a first end and a second end.

In the embodiment, the first end of the first up capacitor C1U may receive an input up signal Viu. The second end of the first up capacitor C1U may be electrically connected to the second end of first up transistor T_U1. The first end and a control end of the first up transistor T_U1 may receive a first reference voltage VH. The first end of the second up transistor T_U2 may be electrically connected to the second end of the first up transistor T_U1. A control end of the second up transistor T_U2 may receive the first reference voltage VH. The second end of the second up transistor T_U2 may be electrically connected to the first end of the second capacitor C132.

In the embodiment, the first end of the first down capacitor C1D may receive an input down signal Vid. The second end of the first down capacitor C1D may be electrically connected to the first end of first down transistor T_D1. The second end and a control end of the first down transistor T_D1 may receive a second reference voltage VL. The first end of the second down transistor T_D2 may be electrically connected to the first end of the first down transistor T_D1. A control end of the second down transistor T_D2 may receive the second reference voltage VL. The second end of the second down transistor T_D2 may be electrically connected to the first end of the second capacitor C132. The first end of the second capacitor C132 may provide an output signal Vo13. In the embodiment, the first end of the reset transistor T13r may receive a reset voltage Vrst13. The control end of the reset transistor T13r may receive a reset signal RES13. The second end of the reset transistor T13r may provide the output signal Vo13.

Referring to FIG. 1 and FIG. 13, the first up transistor T_U1, the second up transistor T_U2, the reset transistor T13r, the first up capacitor C1U, and the second capacitor C132 may form a pump up circuit as the charge pump circuit 100 of FIG. 1. The first down transistor T_D1, the second down transistor T_D2, the reset transistor T13r, the first down capacitor C1D, and the second capacitor C132 may form a pump down circuit. That is, the output signal Vo13 may include a plurality of pump up signals and a plurality of pump down signals according to the input up signal Viu and the input down signal Vid. By changing the combination of the input up signal Viu and the input down signal Vid, a variety of the output signals Vo13 may be obtained. Therefore, the arbitrary waveform generator 1300 may output arbitrary waveforms.

In summary, according to the charge pump circuit of the disclosure, by the above circuit designs of the charge pump circuit, the charge pump may output a plurality of waveforms according to the input signal and the output of the charge pump is linear. Further, since the structure of the charge pump circuit is simple, the charge pump circuit may be disposed on the substrate of the AM-LED display panel, and thereby an in-pixel sweep signal generator may be implemented.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A charge pump circuit, comprising:
   a first transistor, having a first end and a second end;
   a first capacitor, having a first end and a second end, wherein the second end of the first capacitor is electrically connected to the second end of the first transistor;
   a second transistor, having a first end and a second end, wherein the first end of the second transistor is electrically connected to the second of the first transistor;
   a second capacitor, having a first end and a second end, wherein the first end of the second capacitor is electrically connected to the second end of the second transistor; and
   a reset transistor, having a first end and a second end, wherein the first end of the reset transistor is electrically connected to the first end of the second capacitor, the second end of the reset transistor receives a reset voltage, and a control end of the reset transistor receives a reset signal,
   wherein the first end of the first transistor is electrically connected to a control end of the first transistor.

2. The charge pump circuit according to claim 1, wherein the first end of the first capacitor receives an input signal.

3. The charge pump circuit according to claim 1, wherein the first end of the second capacitor provides an output signal.

4. The charge pump circuit according to claim 1, wherein the second transistor is a P-type transistor.

5. The charge pump circuit according to claim 1, wherein the second transistor is an N-type transistor.

6. The charge pump circuit according to claim 1, further comprising:
   a third transistor, having a first end and a second end, wherein the third transistor is electrically connected between the second end of the second transistor and the first end of the second capacitor;
   a third capacitor, having a first end and a second end, wherein the first end of the third capacitor is electrically connected to a control end of the second transistor;
   a fourth transistor, having a first end and a second end, wherein the fourth transistor is electrically connected between the second end of the second transistor and the first end of the third capacitor;
   a fifth transistor, having a first end and a second end, wherein the fifth transistor is electrically connected between the second end of the fourth transistor and the second end of the third capacitor; and
   a sixth transistor, having a first end and a second end, wherein the sixth transistor is electrically connected between the second end of the third transistor and the second end of the second capacitor.

7. The charge pump circuit according to claim 6, wherein a control end of the fifth transistor receives the reset signal, and a control end of the sixth transistor receives an initialization signal.

8. The charge pump circuit according to claim 6, wherein a control end of the third transistor and a control end of the fourth transistor receive a compensation signal.

9. The charge pump circuit according to claim 6, wherein the second transistor is a P-type transistor.

10. The charge pump circuit according to claim 6, wherein the second transistor is an N-type transistor.

11. The charge pump circuit according to claim 1, further comprising:
    a third transistor, having a first end and a second end,
    a fourth transistor, having a first end and a second end, wherein the second end of the fourth transistor is electrically connected to the first end of the third transistor;
    a fifth transistor, having a first end and a second end, wherein the first end of the fifth transistor is electrically connected to the first end of the fourth transistor;
    a sixth transistor, having a first end and a second end, wherein the first end of the sixth transistor is electrically to the first end of the second capacitor, the second end of the sixth transistor is electrically to the second end of the second capacitor; and
    a third capacitor, having a first end and a second end, wherein the first end of the third capacitor is electrically connected to the first end of the fifth transistor, the second end of the third capacitor is electrically connected to the second end of the fifth transistor.

12. The charge pump circuit according to claim 11, wherein a control end of the fifth transistor receives the reset signal,
    wherein a control end of the sixth transistor receives an initialization signal.

13. The charge pump circuit according to claim 11, wherein the second end of the third transistor is electrically connected to a control end of the third transistor,
    wherein the first end of the fourth transistor is electrically connected to a control end of the fourth transistor.

14. The charge pump circuit according to claim 11, wherein a threshold voltage of the first transistor and a threshold voltage of the third transistor are the same,
    wherein a threshold voltage of the second transistor and a threshold voltage of the fourth transistor are the same.

15. The charge pump circuit according to claim 1, further comprising:
    a third transistor, having a first end and a second end, wherein the third transistor is electrically connected between the second end of the second transistor and the first end of the second capacitor;
    a third capacitor, having a first end and a second end, wherein the first end of the third capacitor is electrically connected to a control end of the second transistor;
    a fourth transistor, having a first end and a second end, wherein the fourth transistor is electrically connected between the second end of the second transistor and the first end of the third capacitor;
    a fifth transistor, having a first end and a second end, wherein the fifth transistor is electrically connected between the second end of the fourth transistor and the second end of the third capacitor;
    a sixth transistor, having a first end and a second end, wherein the first end of the sixth transistor is electrically connected to the first end of the second capacitor;
    a seventh transistor, having a first end and a second end, wherein the second end of the seventh transistor is electrically connected to the second end of the sixth transistor;
    an eighth transistor, having a first end and a second end, wherein the first end of the eighth transistor is electrically connected to the second end of the seventh transistor; and a ninth transistor, having a first end and a second end, wherein the first end of the ninth transistor is electrically connected to the second end of the eighth transistor.

16. The charge pump circuit according to claim 15, wherein a control end of the fifth transistor receives the reset signal.

17. The charge pump circuit according to claim 15, wherein a control end of the third transistor and a control end of the fourth transistor receive a first compensation signal,
wherein a control end of the sixth transistor, a control end of the seventh transistor, and a control end of the ninth transistor receive a second compensation signal.

18. The charge pump circuit according to claim 15, wherein the second end of the eighth transistor provides an output signal.

* * * * *